(12) United States Patent
Park et al.

(10) Patent No.: US 10,623,944 B2
(45) Date of Patent: Apr. 14, 2020

(54) METHOD AND APPARATUS FOR PROFILE DOWNLOAD OF GROUP DEVICES

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Sangsoo Jeong, Suwon-si (KR); Joohyun Park, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/113,378

(22) Filed: Aug. 27, 2018

(65) Prior Publication Data

US 2018/0367984 A1    Dec. 20, 2018

Related U.S. Application Data

(63) Continuation of application No. 15/406,203, filed on Jan. 13, 2017, now Pat. No. 10,064,047, which is a (Continued)

(30) Foreign Application Priority Data

Aug. 14, 2014    (KR) .................. 10-2014-0106039

(51) Int. Cl.
*H04W 8/20* (2009.01)
*H04W 12/04* (2009.01)
(Continued)

(52) U.S. Cl.
CPC ....... *H04W 8/205* (2013.01); *H04W 12/0023* (2019.01); *H04W 12/04* (2013.01); *H04W 12/02* (2013.01); *H04W 88/02* (2013.01)

(58) Field of Classification Search
CPC ..... H04W 12/02; H04W 12/04; H04W 88/02; H04W 8/205
See application file for complete search history.

(56) References Cited

U.S. PATENT DOCUMENTS 9,549,313 B2 * 1/2017 Park .................. H04W 12/04
10,064,047 B2 * 8/2018 Park .................. H04W 12/04
(Continued)

FOREIGN PATENT DOCUMENTS

| WO | 2012/028179 A1 | 3/2012 |
| WO | 2012/042300 A1 | 4/2012 |
| WO | 2012/154600 A1 | 11/2012 |

OTHER PUBLICATIONS

Gemalto, pCR to 22.802, Editorial correction: Use "eUICC Profile" instead of "(U)SIM Profile", 3GPP TSG-SA WG1 #67, S1-143053, Sophia-Antipolis, France, Jul. 30, 2014, See sections 4.3.3; and 4.3.5.1-4.3.5.3.

*Primary Examiner* — Kashif Siddiqui
(74) *Attorney, Agent, or Firm* — Jefferson IP Law, LLP

(57) ABSTRACT

Methods and apparatuses for remotely installing Universal Integrated Circuit Card (UICC) information about various Mobile Network Operators (MNOs) are provided. One of the apparatuses being a terminal including an electronic card, a transceiver configured to transmit and receive a signal, and a controller configured to receive at least one profile from a profile management server, wherein each profile of the received at least one profile is to be installed in an electronic card of at least one device, to obtain at least one electronic card identifier of the at least one device, and to transmit, to the at least one device, the at least one profile corresponding to the obtained at least one electronic card identifier.

22 Claims, 37 Drawing Sheets

Related U.S. Application Data continuation of application No. 14/695,338, filed on Apr. 24, 2015, now Pat. No. 9,549,313.

(51) Int. Cl.
  *H04W 12/00* (2009.01)
  *H04W 88/02* (2009.01)
  *H04W 12/02* (2009.01)

(56) References Cited

U.S. PATENT DOCUMENTS

| | | | |
|---|---|---|---|
| 2002/0143922 A1* | 10/2002 | Tanimoto | H04L 29/06 709/223 |
| 2004/0042442 A1* | 3/2004 | Pecen | H04W 12/04 370/352 |
| 2007/0004457 A1* | 1/2007 | Han | H04W 8/20 455/558 |
| 2011/0003590 A1* | 1/2011 | Yoon | H04W 36/385 455/432.1 |
| 2012/0260090 A1 | 10/2012 | Hauck et al. | |
| 2012/0260091 A1 | 10/2012 | Fernandez | |
| 2013/0148585 A1* | 6/2013 | Ohlsson | H04L 61/3095 370/328 |
| 2013/0205134 A1* | 8/2013 | Holtmanns | H04W 12/04 713/156 |
| 2013/0227646 A1 | 8/2013 | Haggerty et al. | |
| 2014/0031012 A1 | 1/2014 | Park et al. | |
| 2014/0045460 A1* | 2/2014 | Park | H04W 8/205 455/411 |
| 2014/0082359 A1 | 3/2014 | Nakhjiri et al. | |
| 2015/0373710 A1* | 12/2015 | Laraqui | H04W 72/0453 370/329 |

* cited by examiner

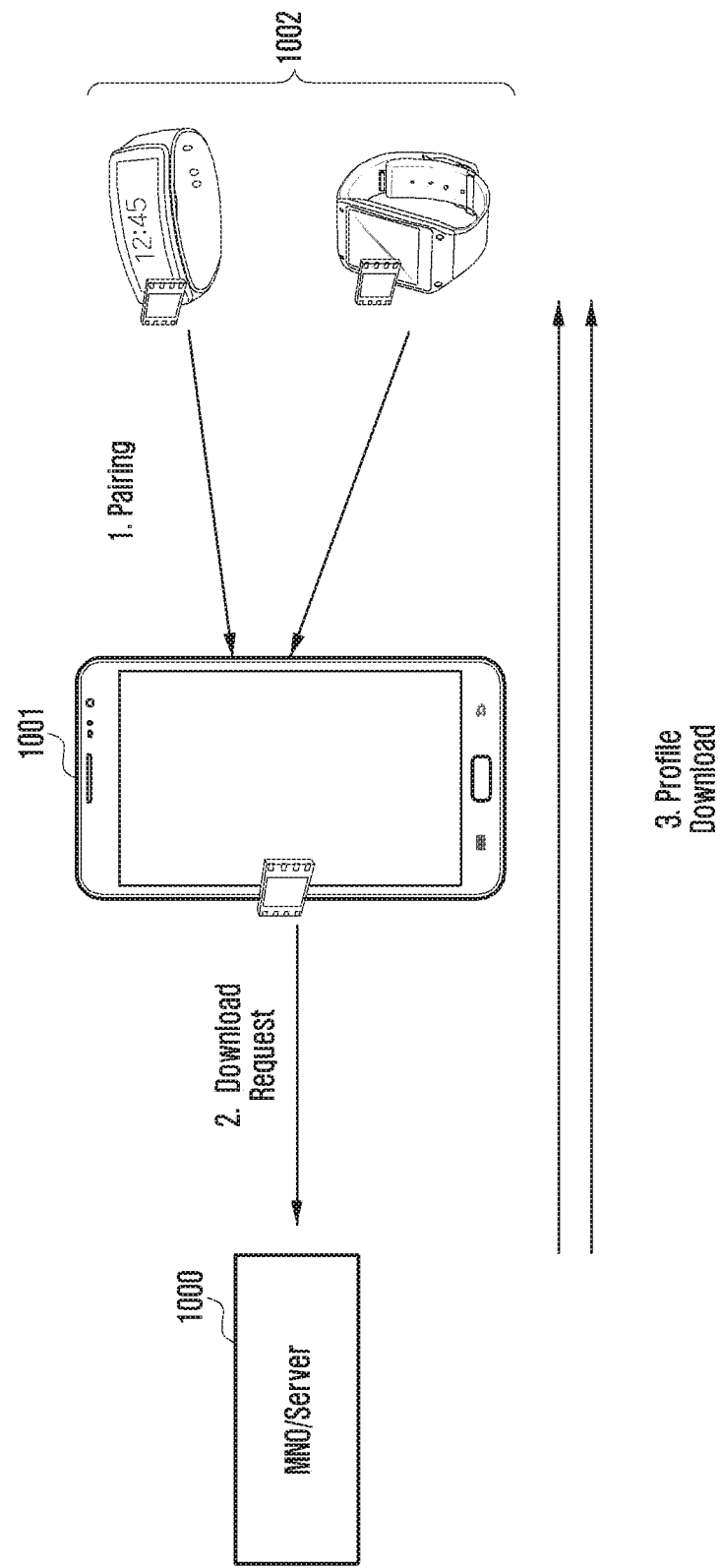

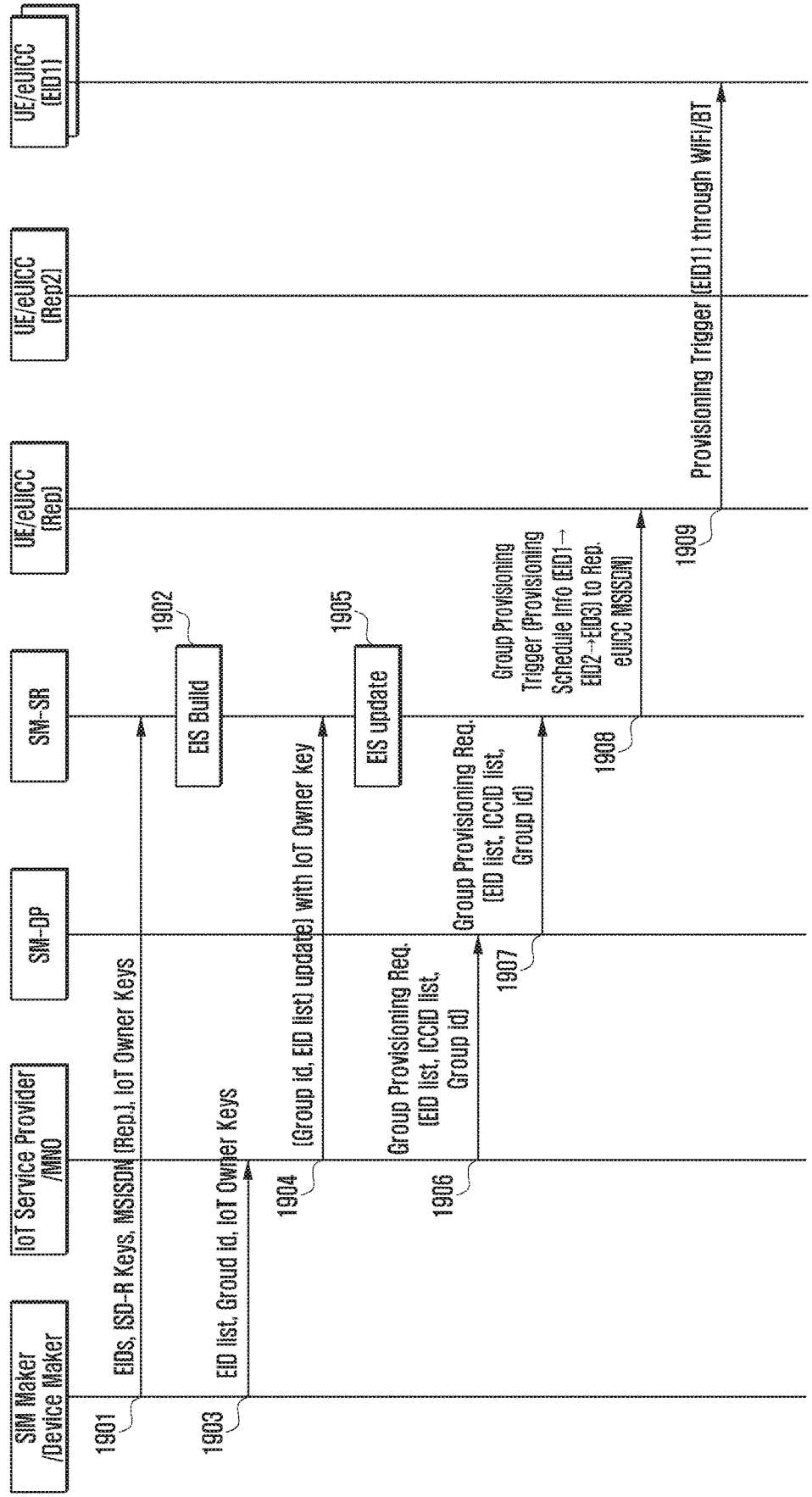

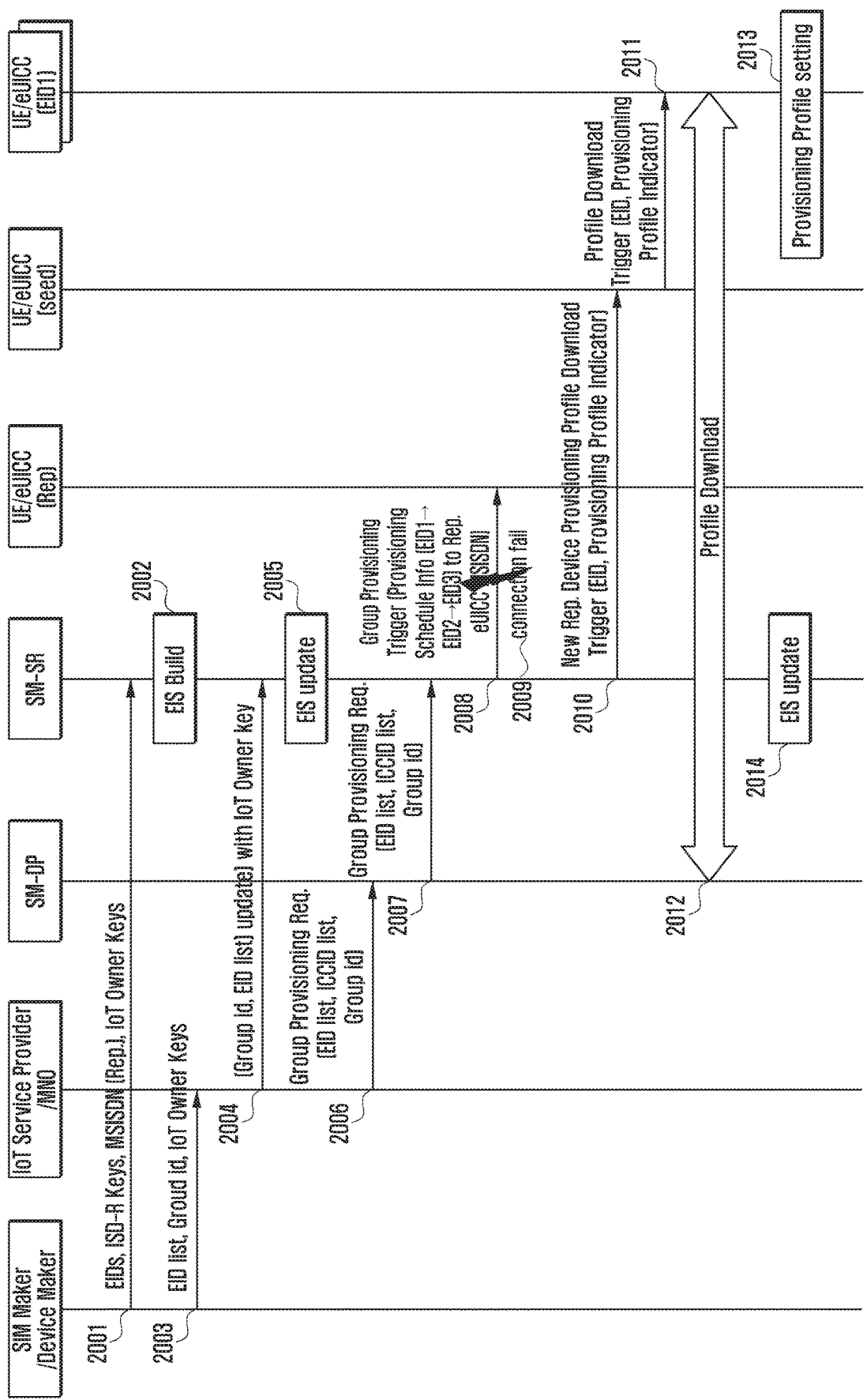

METHOD AND APPARATUS FOR PROFILE DOWNLOAD OF GROUP DEVICES

CROSS-REFERENCE TO RELATED APPLICATION(S)

This application is a continuation application of prior application Ser. No. 15/406,203, filed on Jan. 13, 2017, which will issue as U.S. Pat. No. 10,064,047 on Aug. 28, 2018, which was based on prior application Ser. No. 14/695,338, filed on Apr. 24, 2015, which has issued as U.S. Pat. No. 9,549,313 on Jan. 17, 2017, and was based on and claimed the benefit under 35 U.S.C § 119(a) of a Korean patent application filed on Aug. 14, 2014 in the Korean Intellectual Property Office and assigned Serial number 10-2014-0106039, the entire disclosure of each of which is hereby incorporated by reference.

TECHNICAL FIELD

The present disclosure relates to a method and apparatus for provisioning profiles in a mobile communication device in the field associated with a Universal Integrated Circuit Card (UICC) which is a smart card security module inserted in the device. More particularly, the present disclosure relates to technique to manage, such as remotely install or delete, mobile communication subscriber information in or from an embedded UICC (eUICC) which replaces the UICC and is embedded in a non-removable form in the device.

BACKGROUND

A Universal Integrated Circuit Card (UICC), which can be inserted in a mobile communication device and can be used as a smart card, has personal information about a mobile communication subscriber, such as network access certification information, a phonebook, and Short Message Service (SMS), stored therein. At the time of attachment to a mobile communication network such as Global System for Mobile Communications (GSM), Wideband Code Division Multiple Access (WCDMA), or Long Term Evolution (LTE), the UICC performs subscriber identification and traffic security key creation and thus allows a safe mobile communication. The UICC has a communication application, e.g., Subscriber Identification Module (SIM), Universal SIM (USIM), or Internet Protocol (IP) multimedia SIM (ISIM), mounted therein depending on the type of the mobile communication network, and also provides an upper-level security function for mounting various applications such as electronic wallet, ticketing, and electronic passports.

FIG. 1 is a diagram illustrating two modes of connection to a mobile network by a removable UICC capable of being inserted into or removed from a typical device and by an embedded UICC (eUICC) embedded in the device according to the related art.

Referring to FIG. 1, a typical mode of connection to a mobile network performed by a removable UICC 100 is illustrated. Specifically, the UICC (or USIM) 100 is inserted into a device at operation 101, and then the device connects with a Mobile Network Operator (MNO) using various communication applications such as SIM, USIM, ISIM or the like depending on types of the mobile network to use a mobile communication service at operation 102.

Contrary to that, referring to FIG. 1, a mode of connection to the mobile network using an eUICC (or embedded SIM (eSIM)) is also illustrated. Initially, a profile is installed remotely using Over The Air (OTA) technology based on SMS. For this, the device may connect with another MNO identified as MNO2 using a provisioning profile stored previously in the eUICC at operation 103. Then if an operating profile of MNO joined by the user is downloaded and installed at operation 104, the device can connect with the mobile network at operation 105.

FIG. 2 is a diagram illustrating a method for downloading a profile to an eUICC in each wearable device when there are many wearable devices having the eUICC according to the related art.

Referring to FIG. 2, when a user joins an MNO 100 to use a mobile network, the MNO 100 may offer a profile to the user through Subscription Manager Data Preparation (SM-DP) 110 and Subscription Manager Secure Routing (SM-SR) 120. Specifically, in response to a request of the MNO 100, the SM-DP 110 creates and encrypts a profile for a subscriber who desires to join the MNO and also transfers the encrypted profile to the SM-SR 120. Then the SM-SR 120, which is a server for performing a profile management for eUICC, safely transmits the encrypted profile, received from the SM-DP 110, to a secure module embedded in a corresponding device. After the profile is decrypted and installed in the eUICC, the SM-SR 120 may perform a profile management such as enabling, disabling or deleting the profile.

Referring to FIG. 2, some devices, e.g., a smart phone 101, used by the user essentially require the attachment to the mobile network to perform their inherent functions. However, some devices such as a watch 102, a wrist accessory 103 or glasses 104 can use, for user convenience, a certain service from the mobile network even though the attachment to the mobile network is not required to perform their inherent functions. These devices 102, 103 and 104 are often referred to as wearable devices. In order to download a profile for attaching to the mobile network, the eUICC of each wearable device should send a subscription for the mobile network to the MNO 100 and then download the profile from the SM-SR 120. When a single user has many wearable devices, an excessive burden may arise in the MNO 100, the SM-DP 110 and the SM-SR 120 having to individually download profiles to respective eUICCs of such devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a safe technique to remotely install Universal Integrated Circuit Card (UICC) information about various Mobile Network Operators (MNOs) in the embedded UICC (eUICC) through the network.

Another aspect of the present disclosure is to provide a method and apparatus for remotely downloading a profile from a network server to eUICCs of two or more devices. Namely, the present disclosure provides a method and apparatus for effectively installing profiles in a plurality of devices without requiring each device to directly perform a profile download through a network server (e.g., Subscription Manager Data Preparation (SM-DP) or Subscription Manager Secure Routing (SM-SR)).

In accordance with an aspect of the present disclosure, a terminal is provided. The terminal includes an electronic card, a transceiver configured to transmit and receive a signal, and a controller configured to receive at least one profile from a profile management server, wherein each of the received at least one profile is to be installed in an electronic card of at least one device, to obtain at least one electronic card identifier of the at least one device, and to transmit, to the at least one device, the at least one profile corresponding to the obtained at least one electronic card identifier.

In accordance with another aspect of the present disclosure, a profile management server is provided. The profile management server includes a transceiver configured to transmit and receive a signal, and a controller configured to receive, from a terminal, information to request at least one profile, wherein each of the requested at least one profile is to be installed in an electronic card of at least one device and to transmit, to the terminal, the at least one profile based on the received information.

In accordance with another aspect of the present disclosure, a device is provided. The device includes a transceiver configured to transmit and receive a signal, an electronic card, and a controller configured to transmit an identifier of the electronic card to a terminal, and receive a profile corresponding to the identifier of the electronic card from the terminal, wherein the electronic card is configured to install the received profile.

In accordance with another aspect of the present disclosure, a method performed by a terminal having an electronic card and a controller is provided. The method includes receiving, by the controller, at least one profile from a profile management server, wherein each of the received at least one profile is to be installed in an electronic card of at least one device, obtaining at least one electronic card identifier of the at least one device, and transmitting, to the at least one device, the at least one profile corresponding to the obtained at least one electronic card identifier.

In accordance with another aspect of the present disclosure, a method performed by a profile management server is provided. The method includes receiving, by a controller of the profile management server and from a terminal, information to request at least one profile, wherein each profile of the requested at least one profile is to be installed in an electronic card of at least one device, and transmitting, to the terminal, the at least one profile based on the received information.

In accordance with another aspect of the present disclosure, a method performed by a device having an electronic card and a controller is provided. The method includes transmitting, by the controller, an identifier of the electronic card to a terminal, receiving a profile corresponding to the identifier of the electronic card from the terminal, and controlling the electronic card to install the received profile.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram illustrating a profile download method for group devices according to an embodiment of the present disclosure;

FIGS. 19A and 19B are diagrams illustrating a profile download method for group devices according to various embodiments of the present disclosure;

FIG. 20 is a diagram illustrating a profile download method for group devices according to an embodiment of the present disclosure;

Throughout the drawings, it should be noted that like reference numbers are used to depict the same or similar elements, features, and structures.

DETAILED DESCRIPTION

Figure 1:
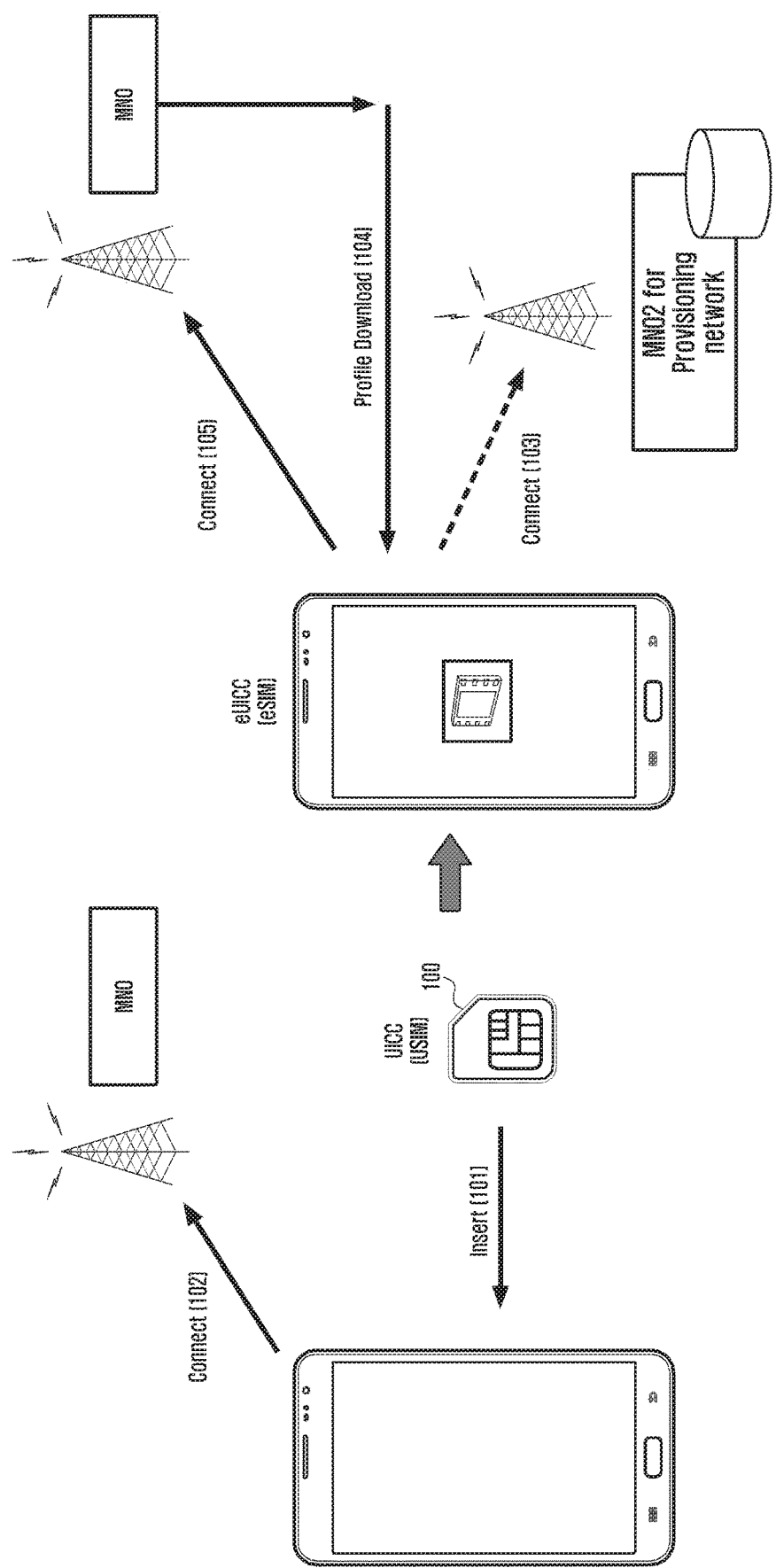
FIG. 1 is a diagram illustrating two modes of connection to a mobile network by a removable Universal Integrated Circuit Card (UICC) capable of being inserted into or removed from a typical device and by an embedded UICC (eUICC) embedded in the device according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be defined as follows. In the present disclosure, an electronic card is a card inserted and used in a mobile communication device. The electronic card may be embedded in the mobile communication device. The electronic card may include Universal Integrated Circuit Card (UICC) and/or embedded UICC (eUICC), and the eUICC may be embedded in the device. The electronic card provide functions to download (or receive) information related to network access, to install the received information, to access the network based on the installed information. The information related to network access may be included in a profile for the mobile communication device (or device) and/or a profile for the electronic card.

In the present disclosure, a UICC is a smart card inserted and used in a mobile communication device. The UICC has personal information about a mobile communication subscriber, such as network access certification information, a phonebook, and Short Message Service (SMS), stored therein. At the time of attachment to a mobile communication network such as Global System for Mobile Communications (GSM), Wideband Code Division Multiple Access (WCDMA), or Long Term Evolution (LTE), the UICC performs subscriber identification and traffic security key creation and thus allows a safe use of mobile communication. The UICC has a communication application, e.g., Subscriber Identification Module (SIM), Universal SIM (USIM), or Internet Protocol (IP) multimedia SIM (ISIM), mounted therein depending on the type of a mobile communication network, and also provides an upper-level security function for mounting various applications such as electronic wallet, ticketing, and electronic passports.

In the present disclosure, an eUICC is a chip-type, non-removable-type security module embedded in the device rather than a removable type allowing insertion into or removal from the device. Using Over The Air (OTA) technology, the eUICC can download and install a profile.

In the present disclosure, the UICC may be used together with a SIM, and the eUICC may be used together with an embedded SIM (eSIM).

In the present disclosure, a profile may refer to software-type packaging of applications, a file system, an authentication key value, network access certification information etc. stored in the UICC. The network access certification information may be used when a terminal (or device) try to access to the network.

In the present disclosure, a USIM profile may have the same meaning as a profile or refer to software-type packaging of information contained in a USIM application within a profile.

In the present disclosure, an Operational Profile may refer to software-type packaging of subscriber information of a mobile network operator joined by a user of a device.

In the present disclosure, a Provisioning Profile may refer to a profile mounted in advance in the eUICC and required for attaching to any mobile communication network of any nation before a user joins a specific mobile network operator.

In the present disclosure, Subscription Manager Data Preparation (SM-DP) may be referred to as a profile providing server, an off-card entity of profile domain, a profile encryption server, a profile creation server, a profile provisioner, or a profile provider.

In the present disclosure, Subscription Manager Secure Routing (SM-SR) may be referred to as a profile management server, an off-card entity of eUICC profile manager, or a profile manager.

In the present disclosure, SM-DP and SM-SR may be physically realized in a single server or in different servers.

In the present disclosure, the term 'device' may be referred to as user equipment (UE), a user terminal (UT), a wireless terminal, an access terminal (AT), terminal, a subscriber unit, a subscriber station (SS), a wireless device, a wireless communication device, a wireless transmit/receive unit (WTRU), a mobile node, a mobile, and the like. According to various embodiments of the present disclosure, the device may include, but not limited to, a cellular phone, a smart phone, a personal digital assistant (PDA), a wireless modem, a portable computer having a wireless communication function, a digital camera or any other equivalent having a wireless communication function, a gaming device having a wireless communication function, a music player or any other equivalent having a wireless communication function, home appliances capable of wireless internet access and browsing, and any portable integrated unit or device having combinations of the above.

Additionally, the device may include, but not limited to, a machine-to-machine (M2M) device or a machine-type communication (MTC) device.

Particularly, in the present disclosure, the device having the eUICC for a profile download may be an Internet of Thing (IoT) device. As well known, IoT is intelligent infra and service technology, based on information communication technology (ICT), for connecting many surrounding things through wired/wireless network and also allowing person-to-machine interactions and machine-to-machine interactions. The IoT device may be operated by at least one IoT operator having a unique identification key for a managed IoT device. Further, in the present disclosure, the device having therein the eUICC for a profile download may be a wearable device. This wearable device may include therein the eUICC or connected (i.e., pairing) to a primary device using Bluetooth or Wi-Fi communication.

In the present disclosure, the term 'a primary device' may be used together with a representative device.

In the present disclosure, the term 'a group device' may refer to a pairing device connected to a primary device, or a secondary device other than a primary device, and be used together with a wearable device or an IoT device.

In the present disclosure, a Profile Identifier (ID) may be referred to as Integrated Circuit Card ID (ICCID) or a factor matched to ICCID and International Subscriber Dialing Preparation (ISD-P). The Profile ID may indicate a unique ID of each profile.

In the present disclosure, eUICC ID may be a unique ID of eUICC embedded in the device and be referred to as an EID. If the eUICC has the Provisioning Profile in advance, the eUICC ID may be Profile ID of the Provisioning Profile. Also, if an eUICC (or eSIM) chip is not separated from the device as shown in various embodiments of the present disclosure, the eUICC ID may be a device ID. And also, the eUICC ID may indicate a specific Secure Domain.

Additionally, as understood by those skilled in the art, a control unit and a controller used herein may have the same meaning.

An operation of the present disclosure is described hereinafter by taking an example of eUICC, which, however, should be understood as explanation only, not to limit the present disclosure to the eUICC. It should be understood that various embodiments of the present disclosure may be applied to UICC which may support to download, install, transmit, receive and share a profile downloaded from network.

FIGS. 3 through 34, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 3:
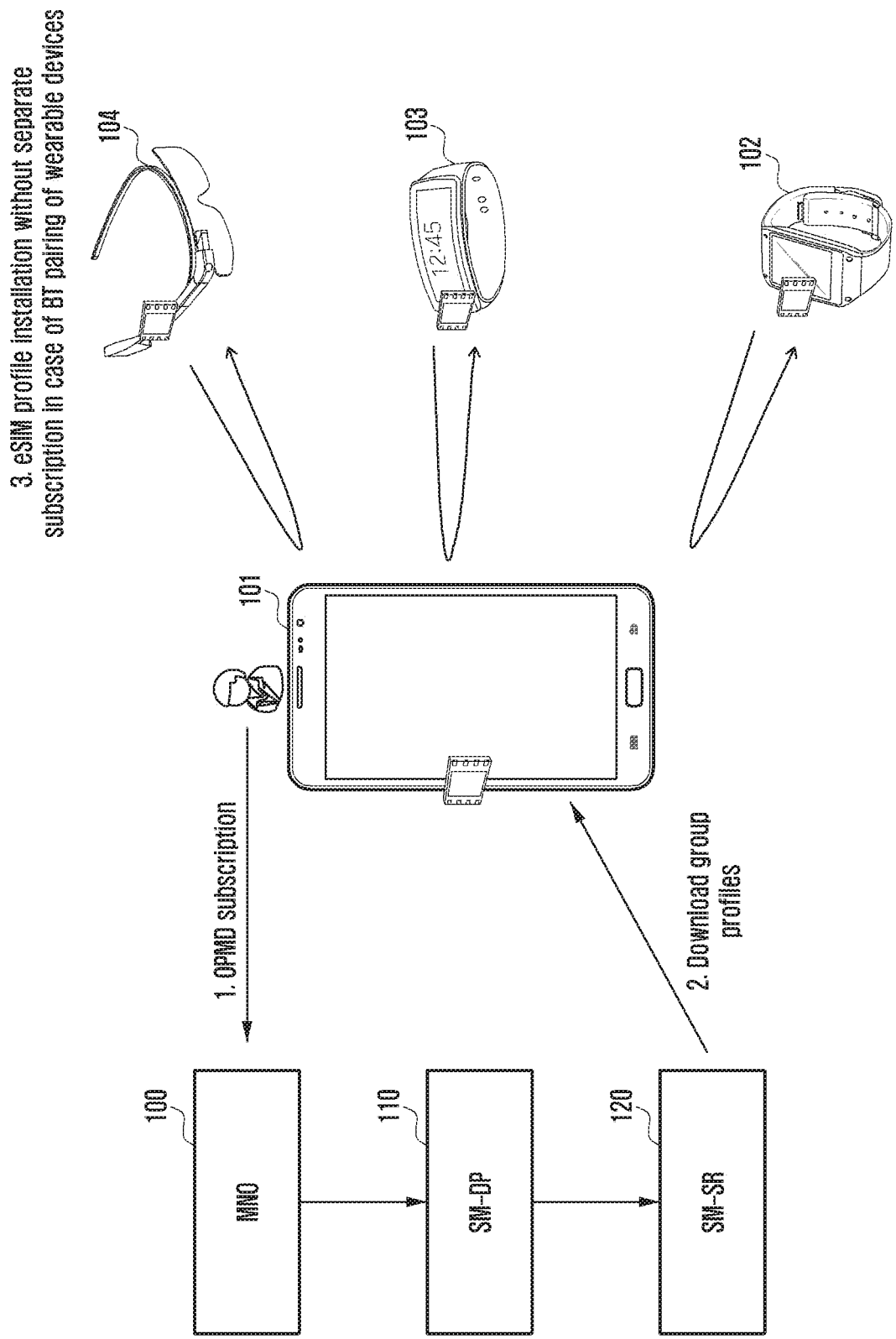
FIG. 3 is a diagram illustrating a method for installing embedded Subscriber Identification Module (eSIM) profiles to many wearable devices according to an embodiment of the present disclosure.

FIG. 3 is a diagram illustrating a method for installing eSIM profiles to many wearable devices according to an embodiment of the present disclosure.

Figure 2:
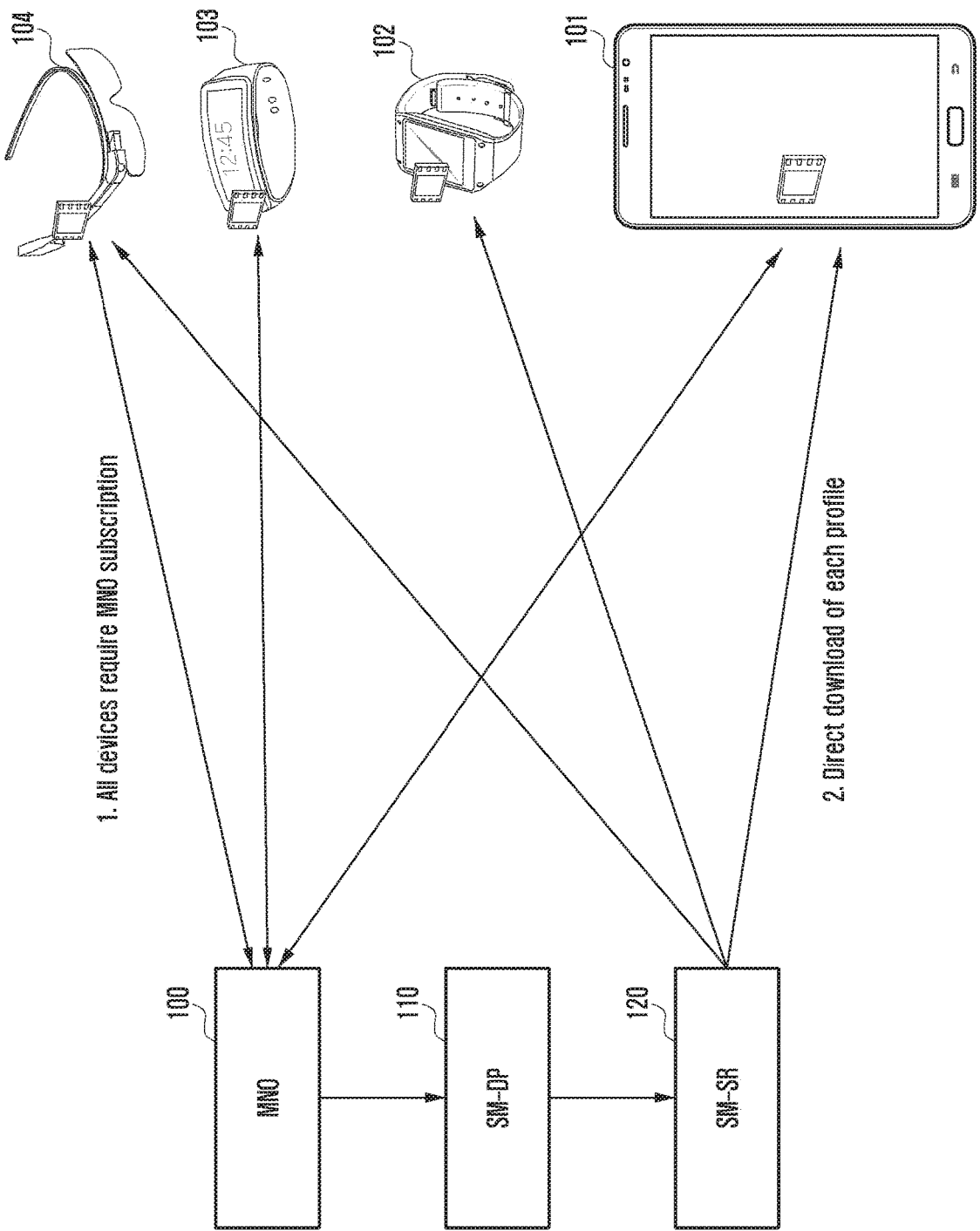
FIG. 2 is a diagram illustrating a method for downloading a profile to an eUICC in each wearable device when there are many wearable devices having the eUICC according to the related art.

Referring to FIG. 3, a method is illustrated, such that when joining a Mobile Network Operator (MNO) 100, a user may subscribe for a one person multiple device (OPMD) service. With a number of smart devices (e.g., a smart phone, a smart pad, etc.) ever increasing, the OPMD service can provide an integrated service that allows a user to manage account information or the like of many devices the user has. In this case, a user's representative device only may perform eUICC subscription without requiring all devices to individually join a mobile network as shown in FIG. 2.

If the user subscribes for the OPMD service, the MNO 100 creates, at SM-DP 110, profiles for a plurality of devices to be used by the user and then transfers such profiles to SM-SR 120. The user can download such profiles from the SM-SR 120 to the eUICC of a primary device 101 among the plurality of devices.

In case of pairing between the primary device 100 and wearable devices 102, 103 and 104 through Bluetooth or the like, each of the wearable devices 102, 103 and 104 can install eSIM profile individually received from the eUICC of the primary device 101 without any additional subscription.

The present disclosure proposes a profile download method for a single primary device 101 and a plurality of wearable devices 102, 103 and 104 as shown in FIG. 3. Specifically, regarding a profile installation of group devices in the present disclosure, an exemplary embodiment will be shown in FIGS. 3 to 5, and another exemplary embodiment will be shown in FIGS. 6 to 8. Additionally, another exemplary embodiment will be shown in FIGS. 9 to 13, and another exemplary embodiment will be shown in FIGS. 14 and 15. Hereinafter, a method for a profile installation of group devices will be described in detail with reference to FIGS. 3 to 15.

Figure 4:
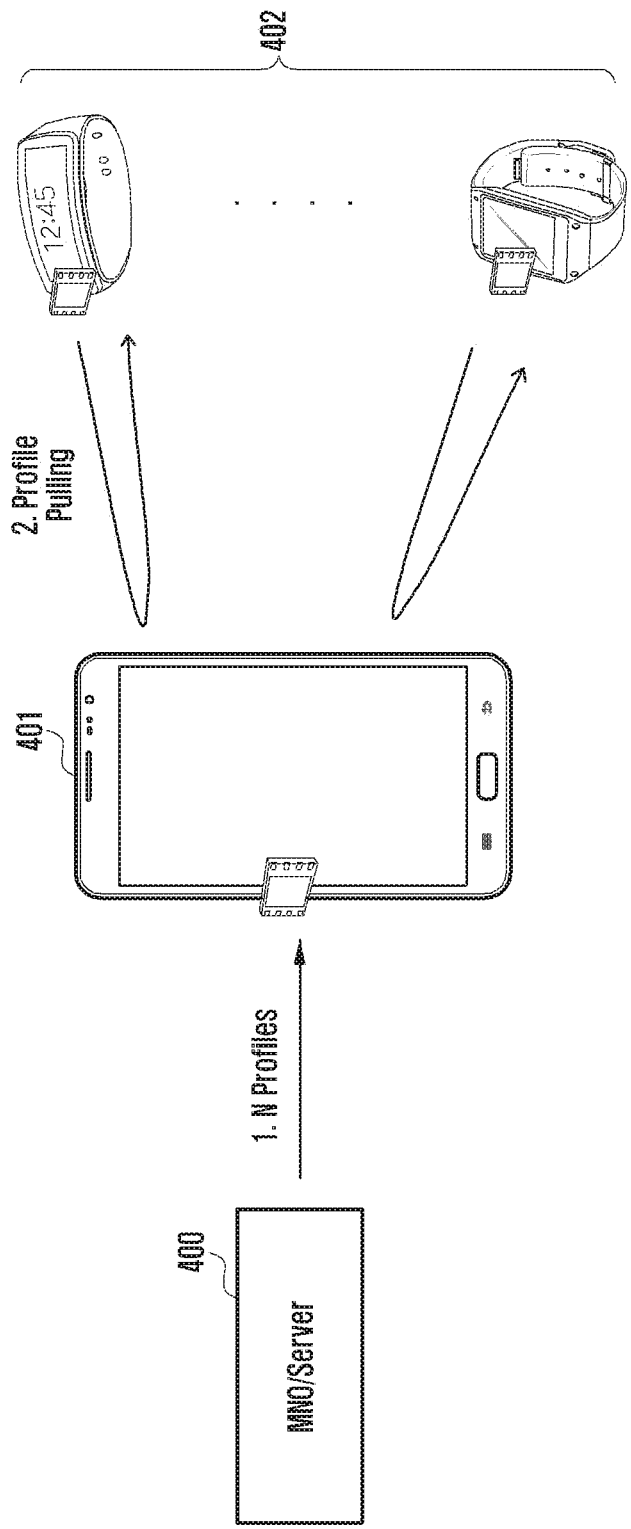
FIG. 4 is a diagram illustrating a profile download method for group devices according to an embodiment of the present disclosure.

FIG. 4 is a diagram illustrating a profile download method for group devices according to an embodiment of the present disclosure.

Referring to FIG. 4, an MNO/server 400 is illustrated, where the MNO/server 400 may collectively refer to MNO, SM-DP and SM-SR. Downloading N profiles from the MNO/server 400 to a primary device 401 may include the following operations. First, the MNO transfers EID of a user device to SM-DP. Second, the SM-DP creates and encrypts a profile corresponding to the received EID and then transfers the profile to the SM-SR that manages the EID and eUICC. Thereafter, the device may perform a profile download through authentication with the SM-SR.

Referring to FIG. 4, the primary device 401 may be a device having the eUICC for downloading a plurality of profiles. In some cases, two or more primary devices each of which is connected with a plurality of wearable devices 402 may be used. There is no restriction on qualification for the primary device 401. Any device may become the primary device 401, depending on a user's choice.

After N profiles are downloaded to the primary device 401, the eUICC of each wearable device 402 paired with the primary device 401 may download a profile (e.g., pull a profile) from the primary device 401. This process will be described in detail with reference to FIGS. 5 and 6.

Figure 5:
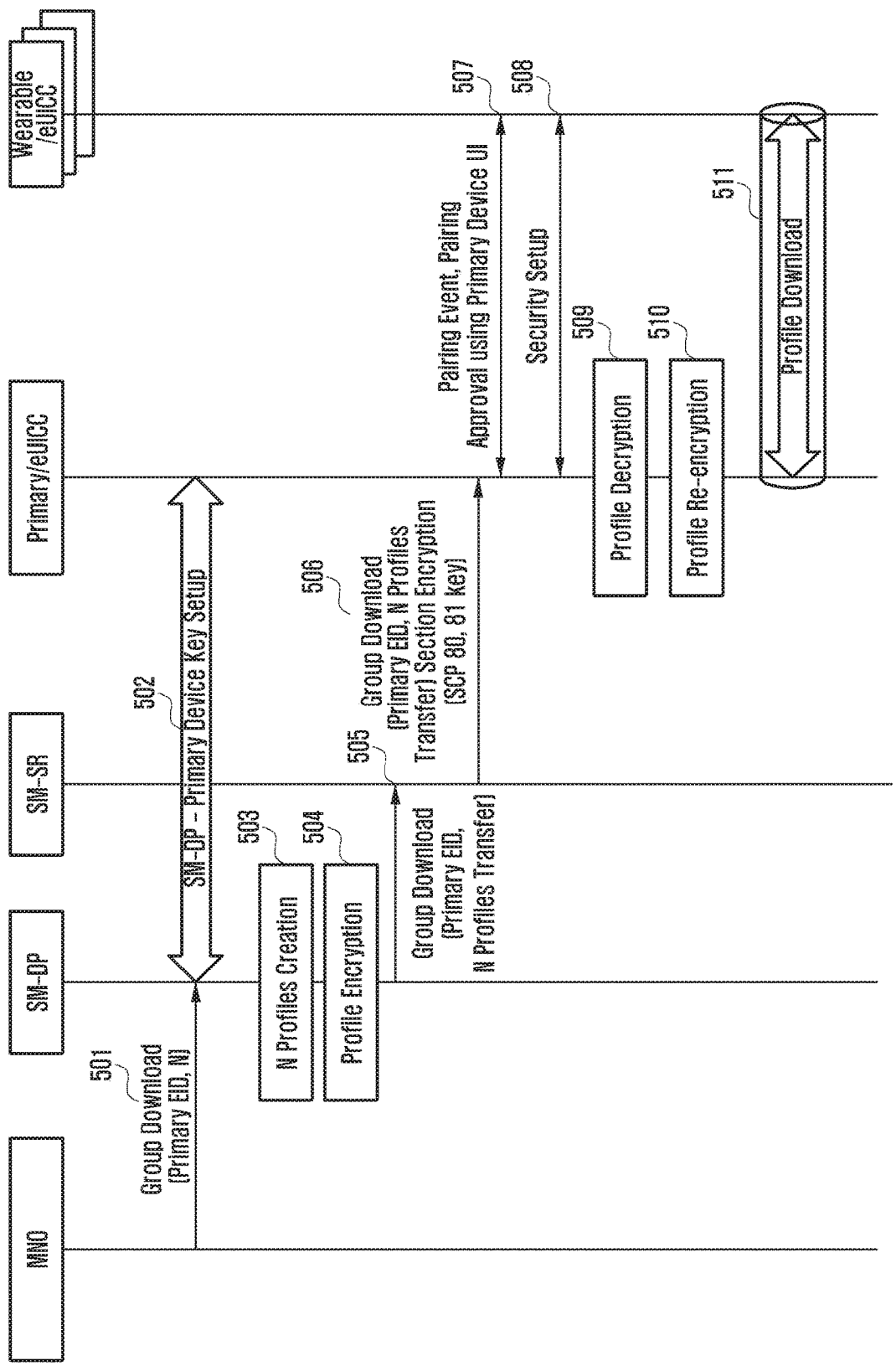
FIG. 5 is a diagram illustrating a profile download method for group devices downloading a plurality of profiles according to an embodiment of the present disclosure.

FIG. 5 is a diagram illustrating a profile download method for group devices downloading a plurality of profiles according to an embodiment of the present disclosure.

Referring to FIG. 5, a profile download method is illustrated, such that when a user joins a mobile communication network, an MNO may receive a number of user's devices to be used. Alternatively, the MNO may determine the number of devices to be used by the user, depending on a rate system used.

The MNO may send a request for a group profile download to the SM-DP. Specifically, at operation 501, the MNO may request the creation of profiles while transmitting EID (i.e., primary EID) of the eUICC embedded in a user's primary device. At this time, the MNO may also transmit the number of required profiles, namely the number of the eUICCs embedded in devices to be used by the user.

At operation 502, the SM-DP performs a key setup with a primary device. The SM-DP creates N profiles requested by the MNO at operation 503, encrypts the created profiles at operation 504, and transfers the created N profiles and EID of the eUICC in the primary device to the SM-SR at operation 505. Thereafter, at operation 506, the primary device creates establish a secure channel with the SM-SR and then may download such profiles through the channel. At this time, a secure channel protocol (SCP), SCP80 or SCP81 defined in the OTA standards, may be used for authentication and encryption between the SM-SR and the eUICC of the primary device.

The primary device may store therein the received N profiles. If pairing occurs with a wearable device at operation 507, this pairing may be approved through User Interface (UI) of the primary device and then a security setup may be performed between the primary device and the wearable device at operation 508. The primary device decrypts the received profile at operation 509 and performs re-encryption for transmission to the wearable device at operation 510. Thereafter, at operation 511, the wearable device can download the profile from the primary device.

Figure 6:
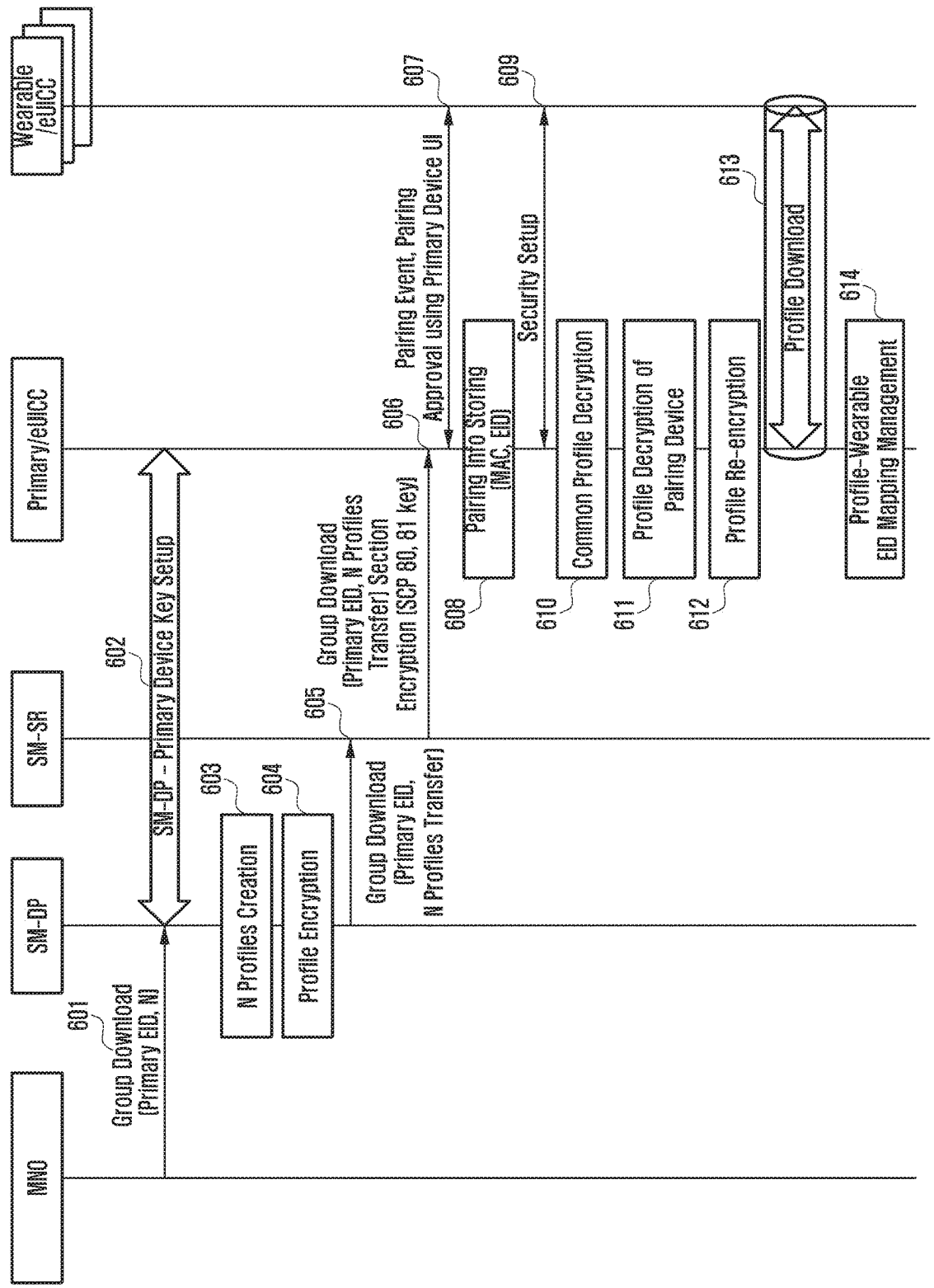
FIG. 6 is a diagram illustrating a profile download method for group devices downloading a single common profile and a personal parameter according to an embodiment of the present disclosure.

FIG. 6 is a diagram illustrating a profile download method for group devices downloading a single common profile and a personal parameter according to an embodiment of the present disclosure.

Referring to FIG. 6, a profile download method is illustrated, in which an MNO may send a request for a group profile download to a SM-DP. Specifically, at operation 601, the MNO may request the creation of profiles while transmitting EID (i.e., primary EID) of the eUICC embedded in a user's primary device. At this time, the MNO may also transmit the number of required profiles, namely the number of the eUICCs embedded in devices to be used by the user.

At operation 602, the SM-DP performs a key setup with the primary device.

According to an embodiment of the present disclosure, as shown in FIG. 6, the SM-DP may create one common profile and transfer N personal parameters to the primary device rather than creating N separate profiles. Specifically, the SM-DP may create N profiles at operation 603 and encrypt personal parameters of the profiles at operation 604. At these operations 603 and 604, the SM-DP may perform the encryption using an SCP03 key.

At operation 605, the SM-DP transfers the created common profile and the N personal parameters together with EID of the eUICC in the primary device to an SM-SR. Thereafter, at operation 606, the primary device creates and establishes a secure channel with the SM-SR and then may download such profiles through the channel. At this time, an SCP, SCP80 or SCP81 defined in the OTA standards, may be used for authentication and encryption between the SM-SR and the eUICC of the primary device.

Meanwhile, pairing occurs with a wearable device at operation 607 after the primary device receives the common profile and the personal parameters, this pairing may be approved through a UI of the primary device. Then, at operation 608, the primary device may store therein mapping data between an MAC address of the paired wearable device and EID information of the eUICC in the wearable device. At this time, the mapping data may be such an MAC address and EID information or alternatively other values for specifying the pairing wearable device and the eUICC.

Thereafter, at operation 609, a security setup may be performed between the primary device and the wearable device. The primary device may decrypt the common profile at operation 610 and decrypt the personal parameters of the common profile at operation 611.

Then, at operation 612, the primary device may encrypt a single profile, using the decrypted common profile and one personal parameter to be transmitted to the eUICC of the wearable device among the decrypted N personal parameters. This encryption may use an SCP03 key.

Thereafter, at operation 613, the eUICC of the wearable device can download the profile from the primary device. Further, at operation 614, the primary device may store and manage mapping data between the profile transmitted to each wearable device and the EID of the eUICC in each wearable device.

Now, a method for managing such wearable devices at the primary device will be described in detail.

The primary device may store an encryption key used when installing profiles in the wearable devices. Additionally, after the installation of profiles, the primary device may manage, using the encryption key, the profiles installed in the wearable devices.

In various embodiments of the present disclosure, the primary device may delete profiles installed in the wearable devices. Additionally, the primary device may disable or enable such profiles installed in the wearable devices. Additionally, the primary device may install the same profile having the same phone number and the same International Mobile Subscriber Identity (IMSI) value in the primary device and the wearable device, and control one profile only to be enabled at the same time. Namely, only one of the primary device and the wearable device, having the same profiles installed therein, is enabled at the same time so that the user can select a device to be used.

According to various embodiments of the present disclosure, for selectively enabling only one of both devices, the primary device may transfer an enable or disable control command to the wearable device, or schedule information may be shared in advance. Alternatively, priorities may be defined to enable a specific device having the highest priority.

Figure 7:
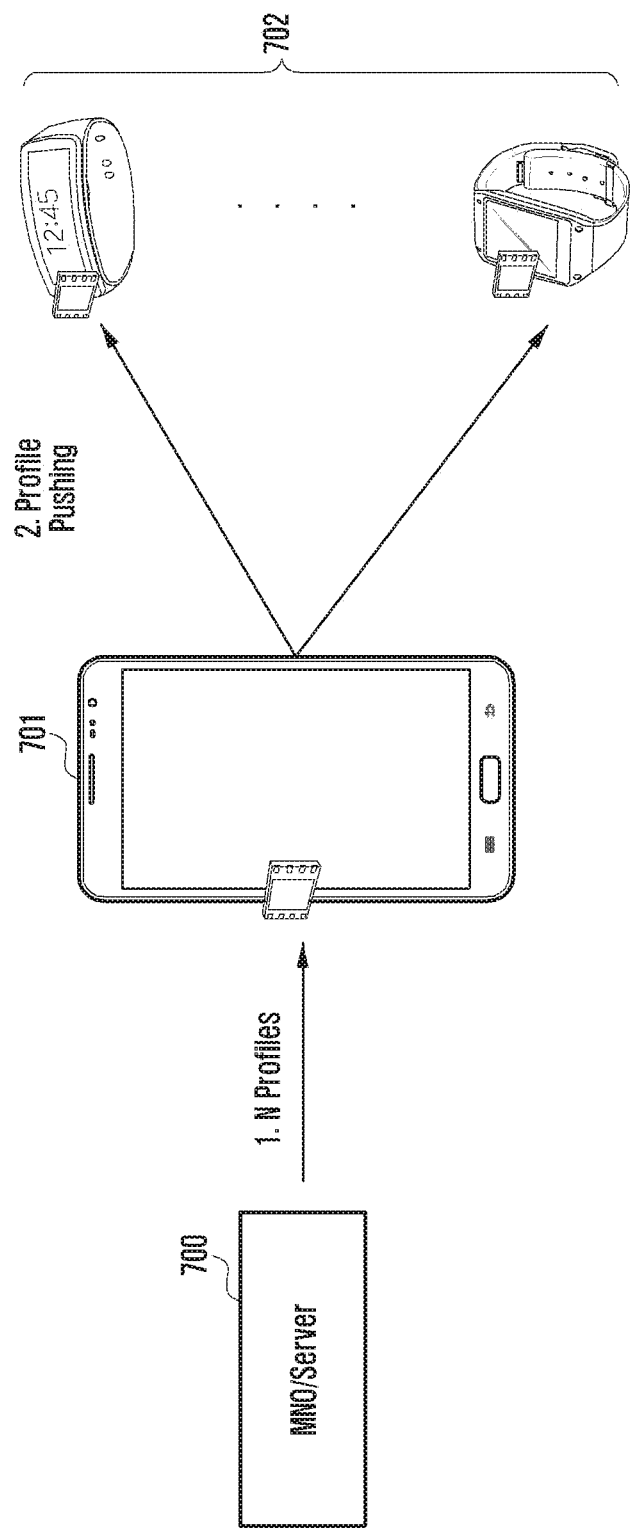
FIG. 7 is a diagram illustrating a profile download method for group devices according to an embodiment of the present disclosure.

FIG. 7 is a diagram illustrating a profile download method for group devices according to an embodiment of the present disclosure.

Referring to FIG. 7, contrary to FIG. 4 case, a profile download method is illustrated, wherein pairing between a primary device 701 and a wearable device 702 may be completed (e.g., by profile pushing) before the primary device 701 downloads a profile (e.g., from an MNO/server 700. In this case, the primary device 701 does not need to wait for pairing so as to transfer a profile to the wearable device 702. Since a profile download is performed after pairing, the primary device 701 can decrypt, re-encrypt and install a profile as soon as the profile is downloaded. A profile download method for group devices in case of pairing between the primary device 701 and a plurality of wearable devices 702 will be described with reference to FIGS. 8 and 9.

Figure 8:
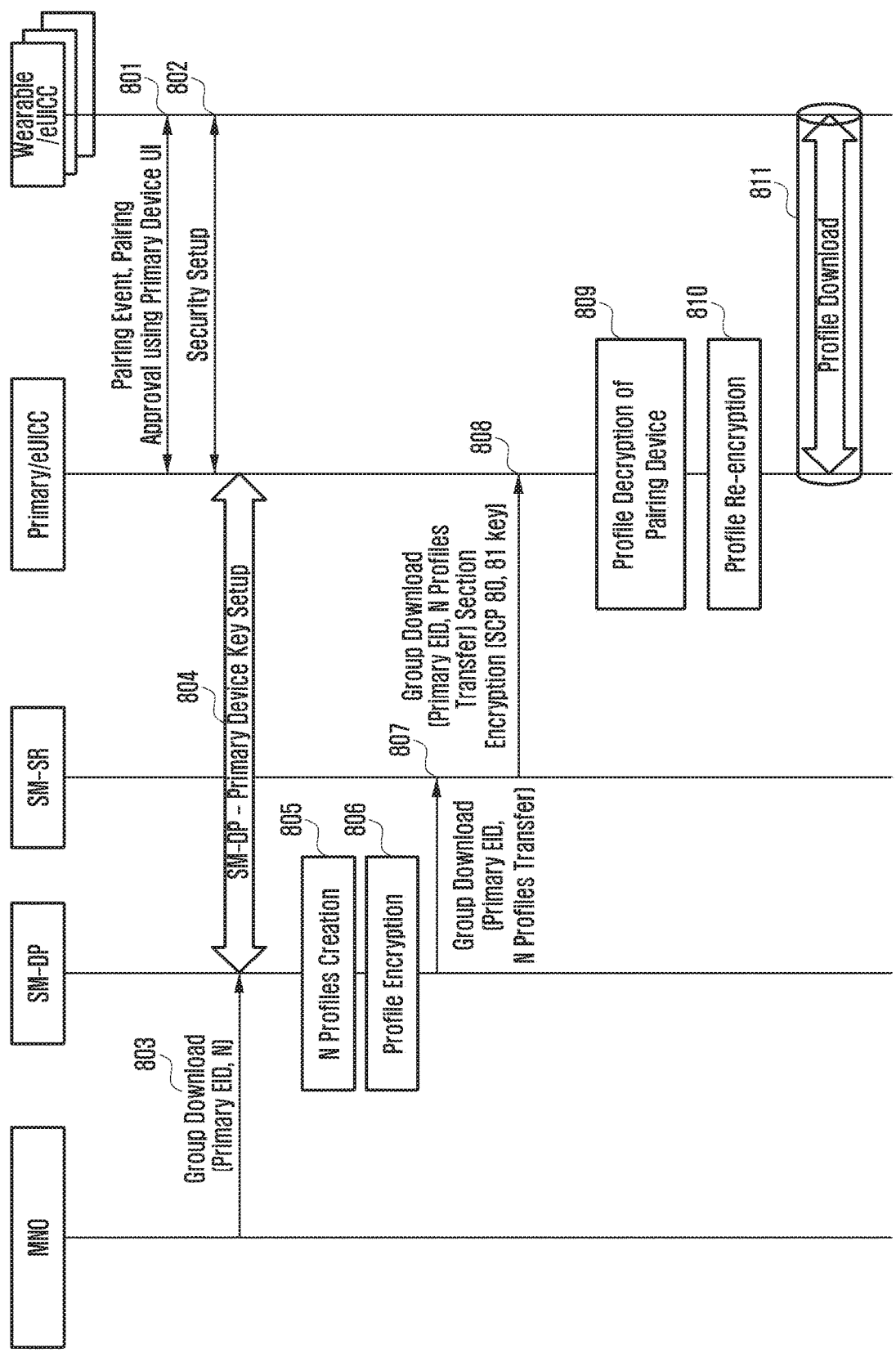
FIG. 8 is a diagram illustrating a profile download method for group devices downloading a plurality of profiles in a pairing state according to an embodiment of the present disclosure.

FIG. 8 is a diagram illustrating a profile download method for group devices downloading a plurality of profiles in a pairing state according to an embodiment of the present disclosure.

Referring to FIG. 8, a profile download method is illustrated, such that when pairing occurs with a wearable device at operation 801, this pairing may be approved through a UI of a primary device. Then, at operation 802, a security setup may be performed between the primary device and the wearable device.

FIG. 8 is different from FIG. 5 in that the wearable devices have been already paired before the primary device performs a profile download. Other operations, namely operations 803 to 808, are the same as operations 501 to 506 in FIG. 5, so that descriptions thereof will be omitted.

At operation 809, if there is any device paired with the primary device, the primary device may perform decryption of the received profile. Then the primary device may perform re-encryption for transmission to the wearable device at operation 810. Thereafter, at operation 811, the wearable device can download the profile from the primary device.

Figure 9:
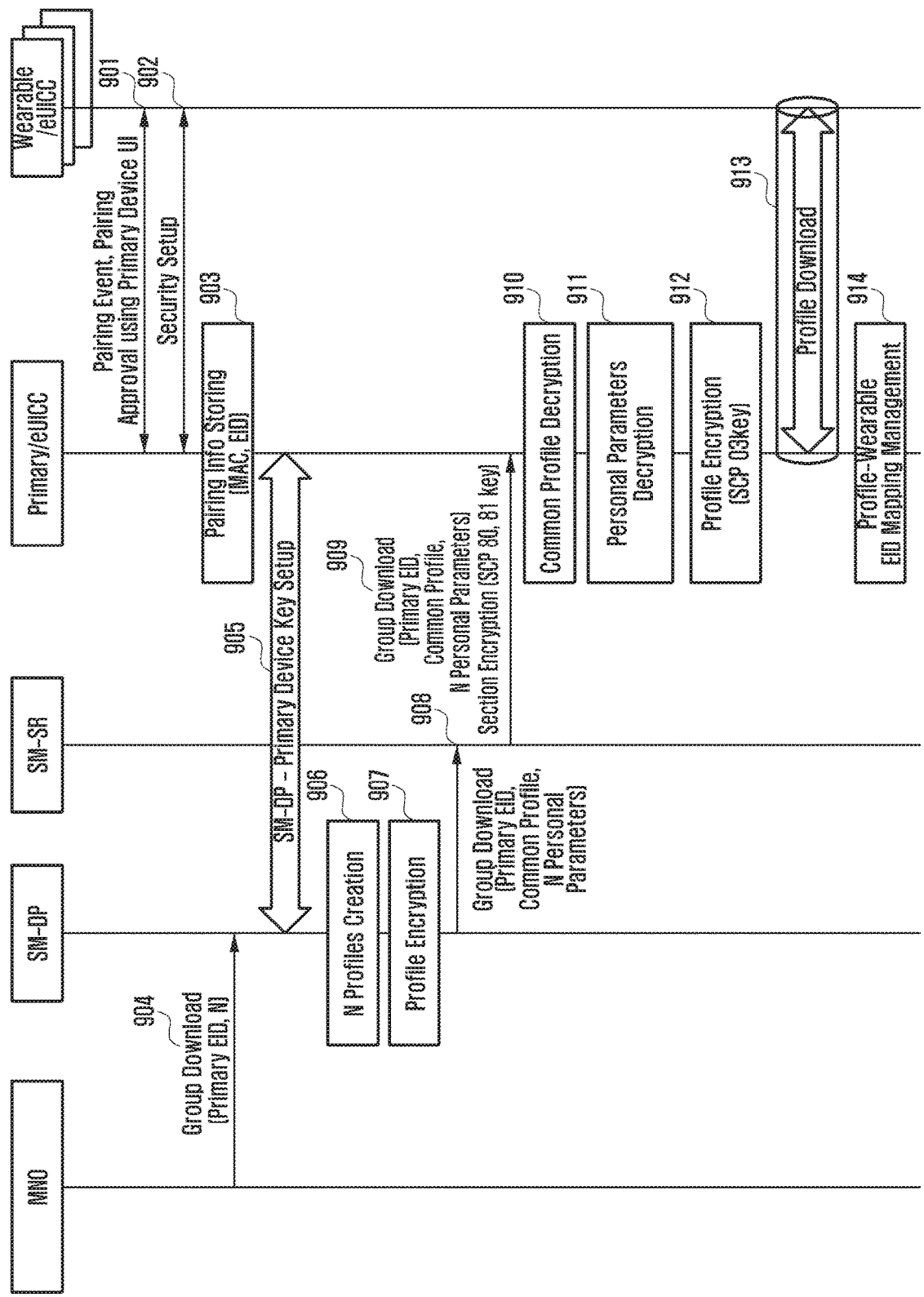
FIG. 9 is a diagram illustrating a profile download method for group devices downloading a single common profile and a personal parameter in a pairing state according to an embodiment of the present disclosure.

FIG. 9 is a diagram illustrating a profile download method for group devices downloading a single common profile and a personal parameter in a pairing state according to an embodiment of the present disclosure.

Referring to FIG. 9, a profile download method is illustrated, such that if pairing occurs with a wearable device at operation 901, this pairing may be approved through UI of a primary device.

At operation 902, a security setup may be performed between the primary device and the wearable device. Then, at operation 903, the primary device may store therein mapping data between a Media Access Control (MAC) address of the paired wearable device and EID information of the eUICC in the wearable device. At this time, the mapping data may be such an MAC address and EID information or alternatively other values for specifying the pairing wearable device and the eUICC.

FIG. 9 is different from FIG. 6 in that the wearable devices have been already paired before the primary device performs a profile download. Other operations, namely operations 904 to 909, are the same as operations 601 to 606 in FIG. 6, and operations 910 to 914 are the same as operations 610 to 614 in FIG. 6, so that descriptions thereof will be omitted.

FIG. 10 is a diagram illustrating a profile download method for group devices according to an embodiment of the present disclosure.

Referring to FIG. 10, a profile download method is illustrated, such that after pairing between a primary device 1001 and wearable devices 1002, the primary device 1001 may perform grouping of pairing wearable devices 1002 and then send a profile download request for the eUICCs of the wearable devices 1002 to an MNO/server 1000. Then the profile is downloaded from the MNO/server 1000 to the wearable devices 1002 via the primary device 1001.

A method for requesting a profile download at the primary device 1001 will be described in detail with reference to FIGS. 11A, 11B, 12 and 13.

Figure 11A:
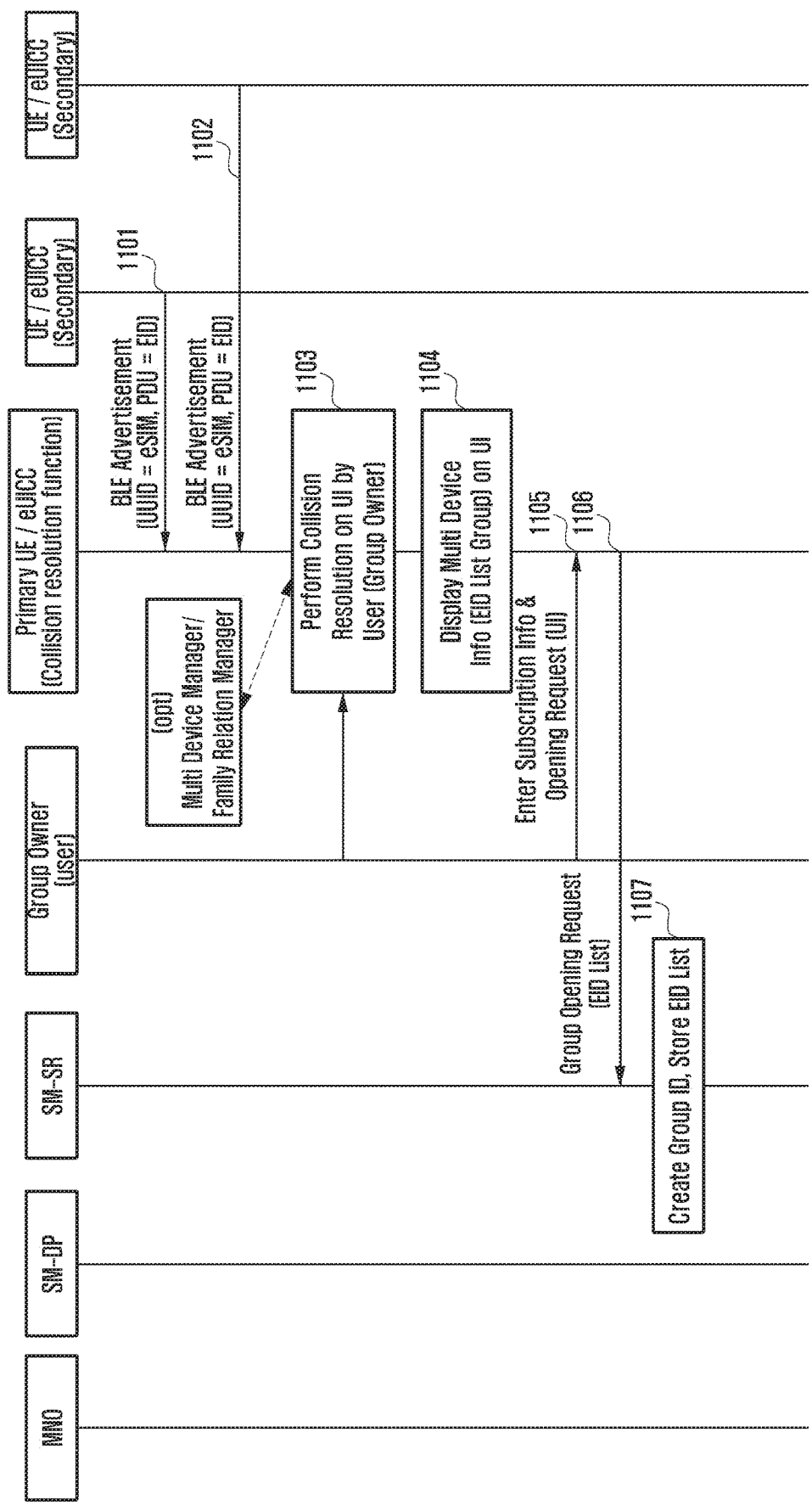
FIGS. 11A and 11B are diagrams illustrating a profile download method for group devices according to various embodiments of the present disclosure.
Figure 11B:
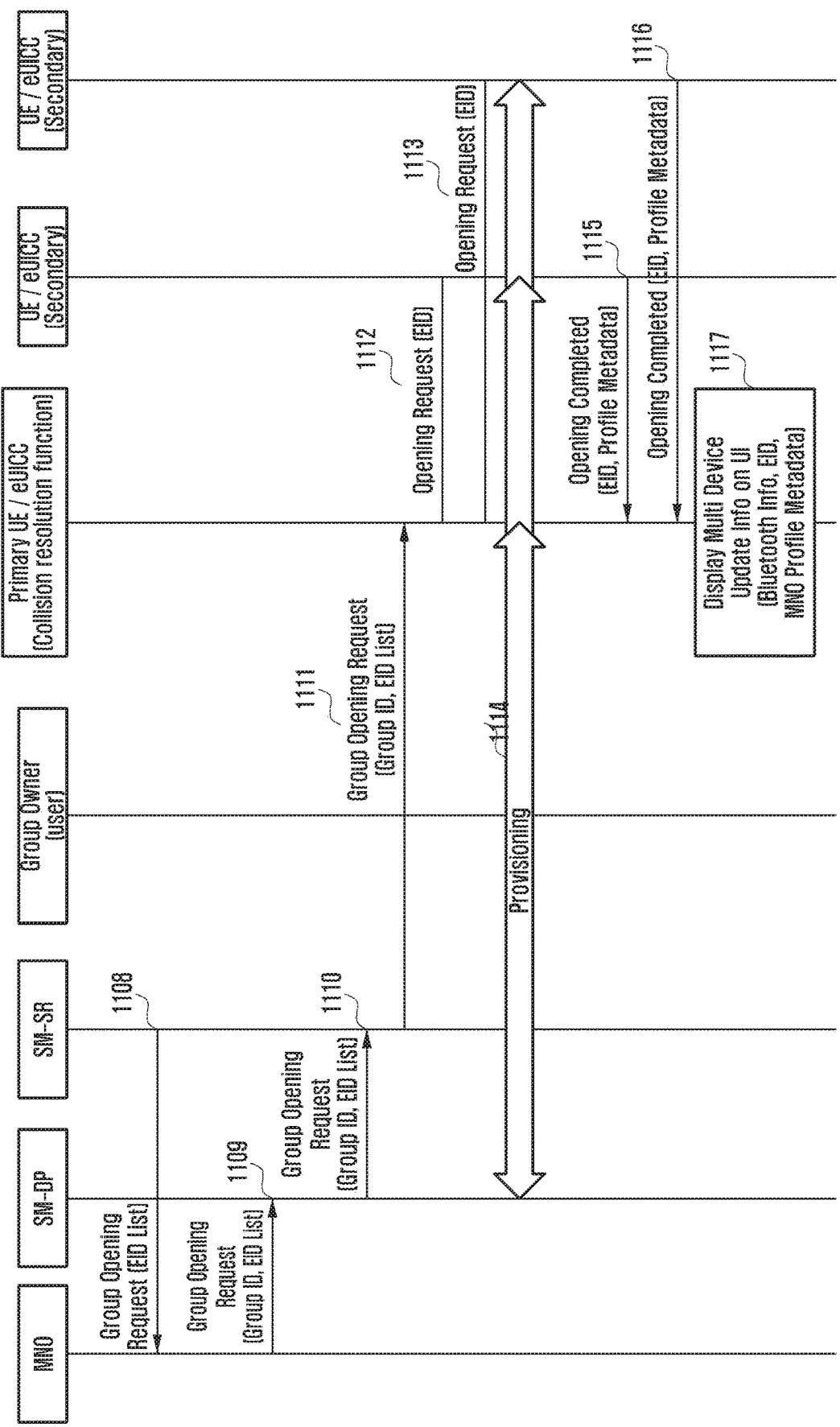

FIGS. 11A and 11B are diagrams illustrating a profile download method for group devices according to various embodiments of the present disclosure.

Referring to FIGS. 11A and 11B, wearable devices are represented as secondary UE/eUICC, and a primary device is represented as primary UE/eUICC.

At operations 1101 and 1102, the secondary devices may send a Bluetooth Low Energy (BLE) advertisement for a Bluetooth connection to the primary device. At this time, a Universally Unique ID (UUID) contained in the advertisement may be an eSIM, and a Protocol Data Unit (PDU) may be an EID of each eUICC. Using them, the primary device can obtain the EID of the eUICC embedded in each wearable device which requests pairing with the primary device.

At operation 1103, the primary device may perform a collision resolution function. This function may be selected by the user on a UI of the primary device. Namely, the user can see a list of wearable devices for pairing with the primary device on the UI of the primary device and delete a duplicate item from the list. The user may be named as a group owner for the primary device and the pairing wearable devices. When the collision resolution function is performed, the primary device may retrieve or store required data from an additional server for managing multi devices or family relation.

A method for performing the collision resolution function in connection with operation 1103 will be more fully described with reference to FIG. 12.

Thereafter, at operation 1104, the primary device may display thereon a list of EIDs of pairing devices. At operation 1105, the user (i.e., a group owner) may enter subscription information and an opening request in the UI of the primary device. At this time, subscription information about group device including the primary device may be entered or alternatively, when a subscription of group devices is requested in advance to the MNO, subscription information about the primary device only may be entered. At operation 1106, the primary device may transmit a group opening request to an SM-SR in response to a user's request for a group opening. At this time, the group opening request may be transmitted together with the EID list of the eUICCs embedded in the wearable devices paired with the primary device.

The SM-SR refers to a server that manages profiles of the primary device and the group devices. At operation 1107, the SM-SR may create a group ID for managing respective groups. In connection with the created group ID, the EID list of the opening-requested eUICCs may be stored.

The SM-SR may transfer the group opening request including the EID list to an MNO at operation 1108, and the MNO may request an SM-DP to create profiles for the group ID and the EIDs in the group ID at operation 1109.

At operations 1110 and 1111, the profiles may be transmitted from the SM-DP, via the SM-SR, to the primary device. At this time, as discussed above, N profiles corresponding to the number of EIDs in the group ID may be transmitted, or alternatively one common profile and N personal parameters may be transmitted. In operations 1112 and 1113 the profiles are transmitted to the wearable devices.

Additionally, according to the above-discussed method, provisioning of the primary device and provisioning of the wearable devices may be performed at operation 1114. Thereafter, at operations 1115 and 1116, the respective wearable devices may transmit a message for notifying the completion of opening to the primary device. This message may contain an EID and metadata of the profile.

At operation 1117, the primary device may offer the user a UI that displays update information about the wearable devices paired with the primary device. This UI may contain Bluetooth information, an EID, MNO profile metadata, and the like. Further, such metadata may include an MNO name, the quantity of data used, a rate system, or the like.

Figure 12:
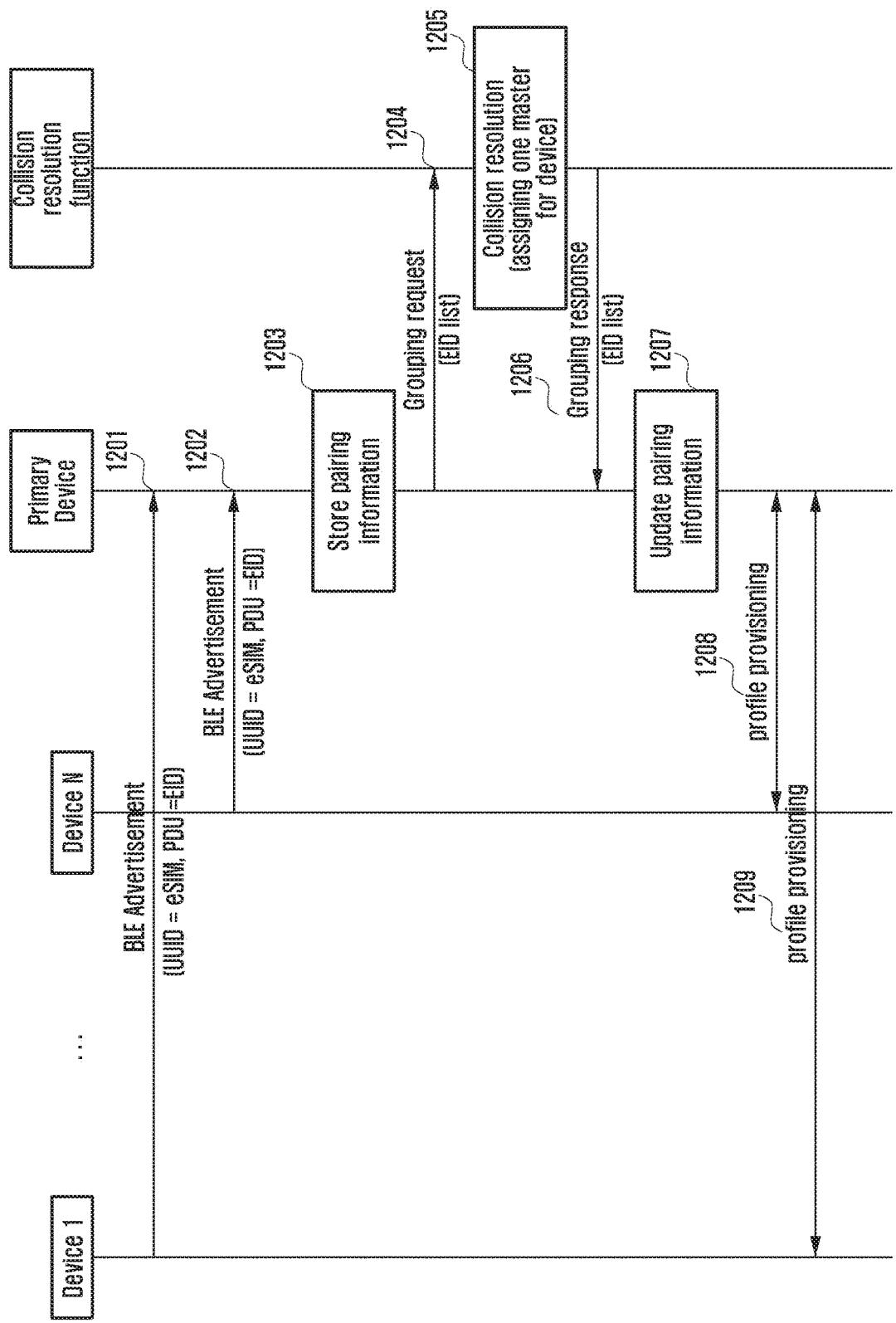
FIG. 12 is a diagram illustrating a procedure of performing a collision resolution function of a primary device in a profile download method for group devices according to an embodiment of the present disclosure.

FIG. 12 is a diagram illustrating a procedure of performing a collision resolution function of a primary device in a profile download method for group devices according to an embodiment of the present disclosure.

Referring to FIG. 12, a procedure of performing a collusion resolution function is illustrated, wherein a plurality of devices, from Device 1 to Device N, may transmit a BLE advertisement for a Bluetooth connection to a primary device at operations 1201 and 1202. At this time, an UUID of the BLE advertisement may be an eSIM, and a PDU may be an EID of each eUICC.

The primary device may store pairing information at operation 1203 and transmit a grouping request to a collision resolution function at operation 1204. This request may contain a list of EIDs stored in the primary device. The collision resolution function may be included in the primary device or formed of a separate operating apparatus or server. Although FIG. 12 shows one primary device, this is not to be considered as a limitation. Alternatively, a grouping request from a plurality of primary devices may be processed at one or more collision resolution functions.

At operation 1205, the collision resolution function may perform collision resolution by deleting a duplicate EID and controlling each EID to be paired with only one primary device. Alternatively, in case there are two or more primary devices, the collision resolution function may delete only the duplicate EID and offer the user a certain UI that inquires which primary device will perform a provisioning request about which EID to be paired with. The collision resolution function may remove the duplicate and colliding EID and assign one master, i.e., the primary device, to each device.

At operation 1206, the collision resolution function may transmit a response to the grouping request to the primary device. This response may contain a grouped EID list.

At operation 1207, the primary device may update pairing information based on the received group information. The primary device may offer the user a profile provisioning UI for a group opening and, in response to a user's choice for group opening, perform a profile provisioning with regard to each of Device 1 to Device N in operations 1208 and 1209.

Figure 13:
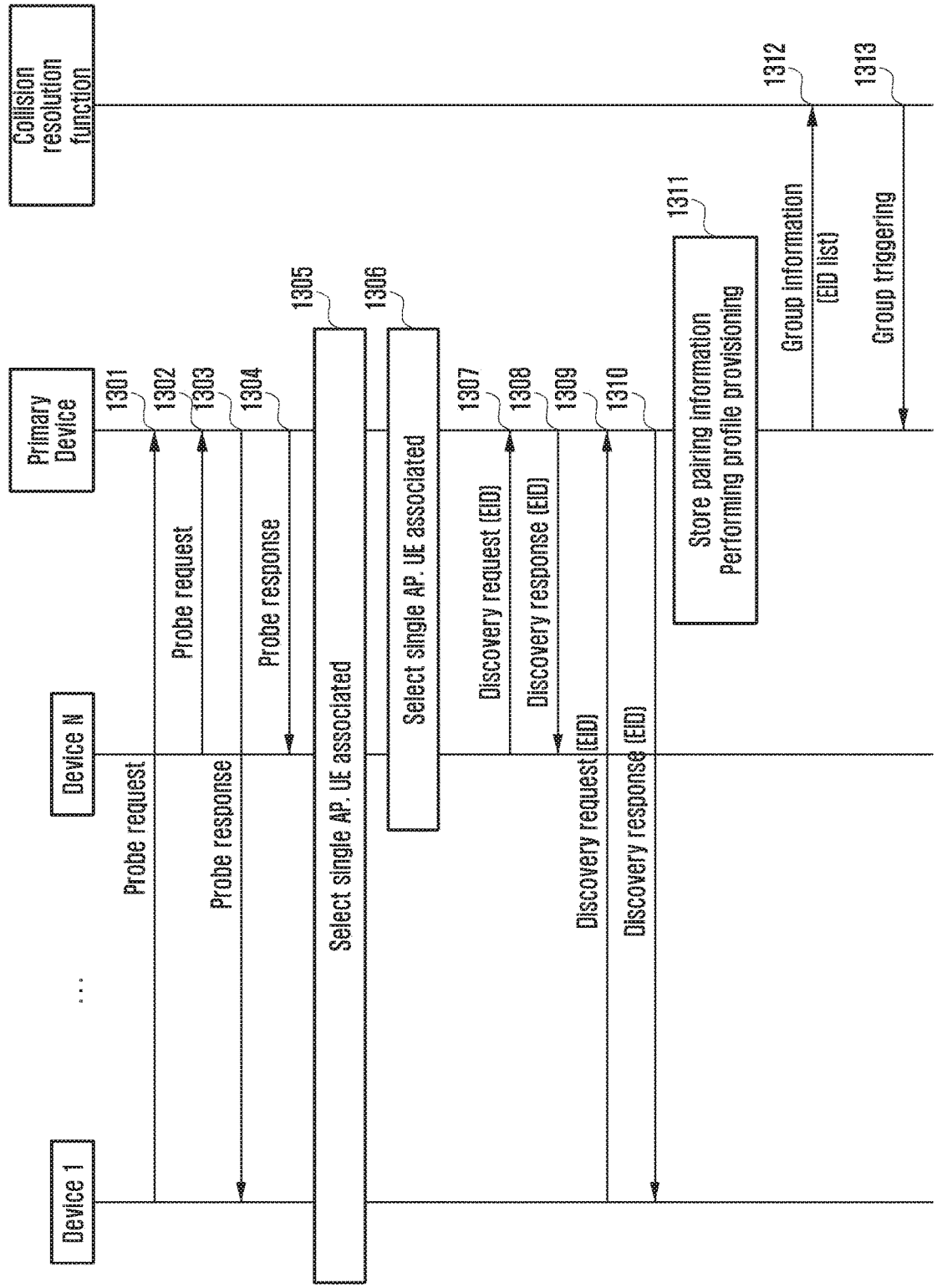
FIG. 13 is a diagram illustrating a procedure of performing a collision resolution function when group devices are paired with a primary device by means of Wi-Fi according to an embodiment of the present disclosure.

FIG. 13 is a diagram illustrating a procedure of performing a collision resolution function when group devices are paired with a primary device by means of Wi-Fi according to an embodiment of the present disclosure.

Although not shown, a primary device, i.e., Access Point (AP), may transmit beacon packet in a broadcast manner to introduce itself. At this time, an SSID of the primary device, a channel, encryption, a transfer rate, etc. may be contained.

Referring to FIG. 13, a procedure of performing a collision resolution function is illustrated, such that at operations 1301 and 1302, a plurality of devices, i.e., Devices 1 to N, may transmit a probe request for Wi-Fi connection to the primary device. In this case, the primary device may operate as an AP.

At operations 1303 and 1304, the primary device may transmit a probe response to each device. Thereafter, the plurality of devices, Devices 1 to N, perform authentication for access to the AP. This authentication process includes open authentication and shared key authentication. For this, although not shown, the Devices 1 to N send an authentication request, and the AP sends a response message. After authentication is completed, the Devices 1 to N send an association request message for obtaining access authority for the AP and receive a corresponding response at operations 1305 and 1306, thereby being associated with the AP. In other words, each of Devices 1 to N selects a single AP.

At operation 1307, the Device N may transmit a discovery request having the EID of the eUICC embedded therein to the primary device. Then the primary device transmits a discovery response to the Device N at operation 1308. At operations 1309 and 1310, similar processes are performed between the Device 1 and the primary device.

At operation 1311, the primary device may store therein pairing information and perform profile provisioning. At operation 1312, the primary device may transmit group information to the collision resolution function. This information may contain the EID list. At operation 131, the collision resolution function may transmit group triggering to the primary device.

Figure 14:
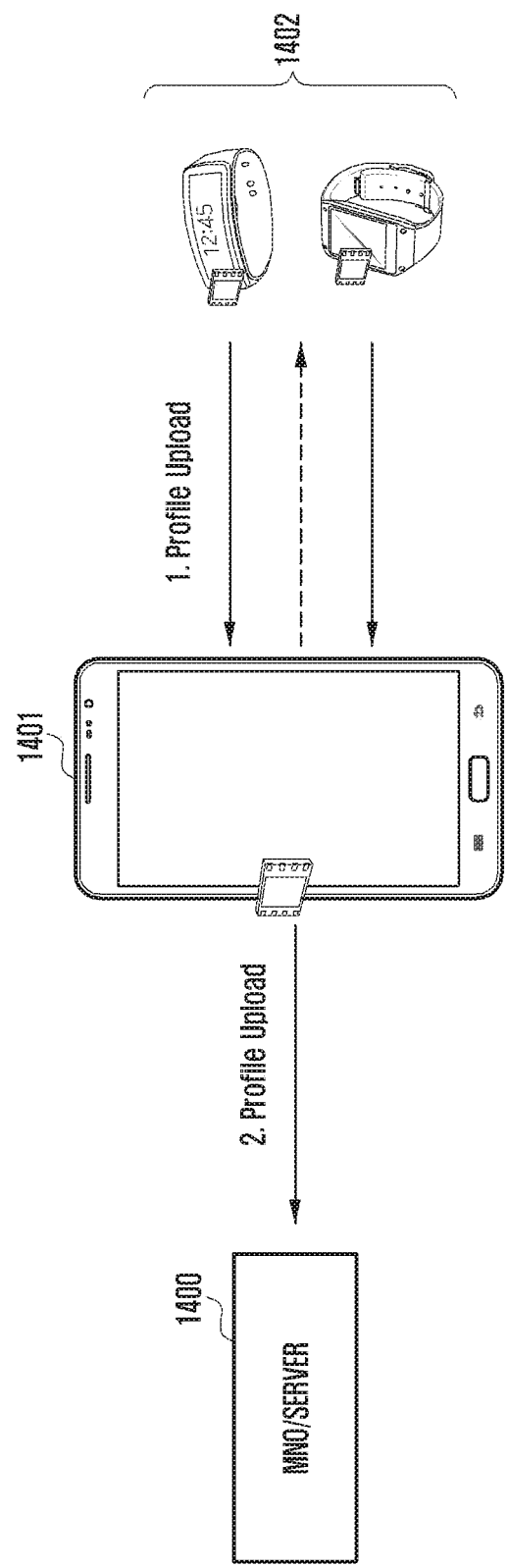
FIG. 14 is a diagram illustrating a profile download method for group devices according to an embodiment of the present disclosure.

FIG. 14 is a diagram illustrating a profile download method for group devices according to an embodiment of the present disclosure.

Referring to FIG. 14, a primary device 1401, an MNO/server 1400 and wearable devices 1402 are illustrated, wherein the wearable devices 1402 may transmit preinstalled or predefined profile information to the MNO/server 1400 through the primary device 1401. A profile installation method shown in FIG. 14 will be more fully described with reference to FIG. 15.

Figure 15:
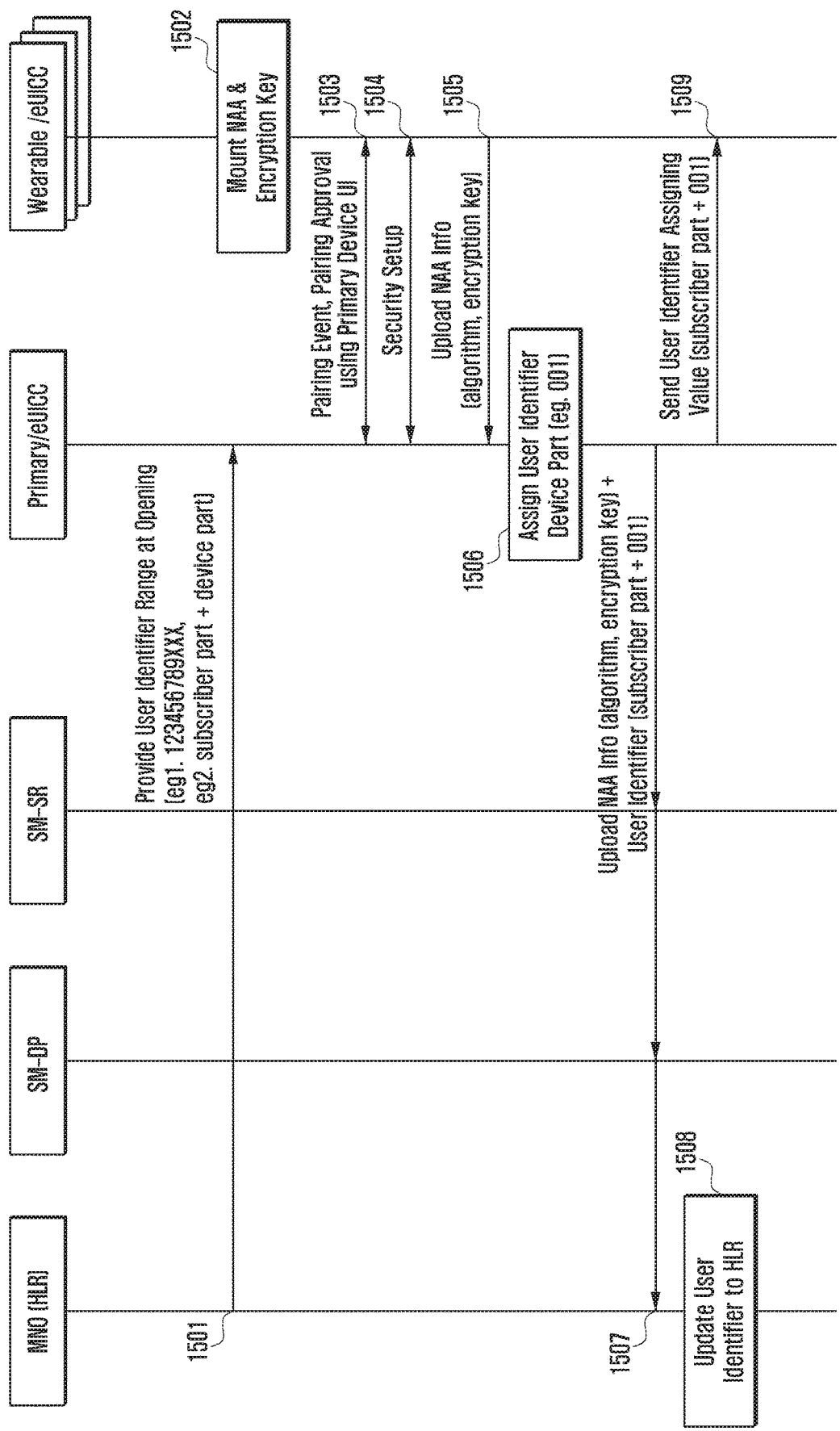
FIG. 15 is a diagram illustrating a method for uploading profile information stored in group devices to a Mobile Network Operator (MNO) according to an embodiment of the present disclosure.

FIG. 15 is a diagram illustrating a method for uploading profile information stored in group devices to an MNO according to an embodiment of the present disclosure.

Referring to FIG. 15, a method for uploading profile information is illustrated, such that at operation 1501, an MNO may offer a subscriber ID to the primary device. In this case, the wearable device may share the subscriber ID assigned to the primary device. The subscriber ID may be IMSI.

The subscriber ID offered to the primary device by the MNO may have the following format, for example:

Subscriber Identifier (450081234567XXX)=Subscriber part (450081234567)+Device part (XXX).

If the subscriber part of the subscriber ID received from the eUICC of a certain device is the same as offered to the primary device by the MNO, the MNO may regard and authenticate the device as one of group devices.

At operation 1502, a wearable device may have a Network Access Application (NAA) and an encryption key mounted in advance. Thereafter, when pairing occurs between the wearable device and the primary device, this pairing may be approved through an UI of the primary device at operation 1503.

Then the primary device and the wearable device may perform a security setup at operation 1504, and the wearable device may upload NAA information to the primary device at operation 1505. Such NAA information may contain an algorithm and an encryption key. At operation 1506, the primary device may assign the subscriber ID to the NAA information.

At operation 1507, the primary device may transmit the NAA information with assigned subscriber ID to an SM-SR. Further, this information may be transferred to an SM-DP and the MNO. At operation 1508, the MNO may update the subscriber ID to a Home Location Register (HLR). At operation 1509 the primary device may transmit a user identifier assigning value to the wearable device.

As discussed above, a profile installation for group devices may be applied to several eUICCs. In some cases, a plurality of eUICCs may be managed by an IoT service provider. Namely, according to an embodiment of the present disclosure, a group management may be performed at MNO/IoT/server.

Hereinafter, a method for managing a plurality of eUICCs at the MNO or the IoT service provider will be described with reference to FIGS. 16 to 20.

Figure 16:
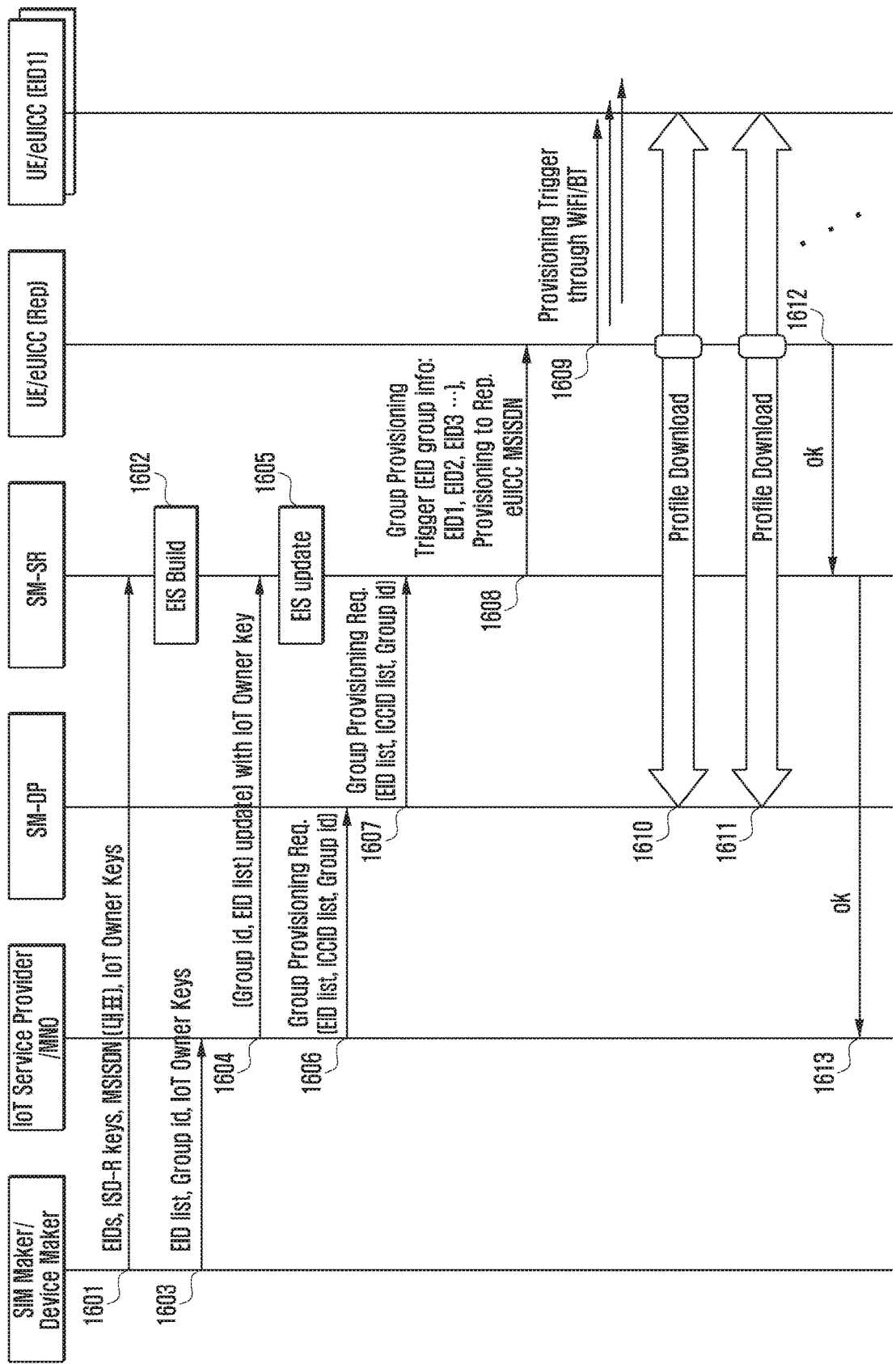
FIG. 16 is a diagram illustrating a profile download method for group devices according to an embodiment of the present disclosure.

FIG. 16 is a diagram illustrating a profile download method for group devices according to an embodiment of the present disclosure.

Referring to FIG. 16, a profile download method is illustrated, such that at operation 1601, an SIM manufacturer or a device manufacturer may offer EIDs, International Subscriber Dialing Routing (ISD-R) keys, a Mobile Station International Subscriber Directory Number (MSISDN) (Rep.), IoT owner keys, etc. to an SM-SR for allowing a group management. Specifically, for a group management, the SIM manufacturer may offer at least one of EIDs, ISD-R keys or MSISDN to the SM-SR, and the IoT service provider may offer a unique key indicating a user of IoT service to the SM-SR.

At operation 1602, the SM-SR may build an eUICC Information Set (EIS) based on received information. This EIS may indicate various kinds of eUICC-related information (EID, ICCID, etc.) stored in the SM-SR.

At operation 1603, the SIM or device manufacturer may create one group from a specific range of EIDs, define a group ID, and offer such information to the IoT service provider/MNO. Therefore, the IoT service provider/MNO can know the EID list contained in each group ID.

The IoT service provider/MNO may transmit the received group ID, the EID list, and IoT owner key to the SM-SR at operation 1604, and the SM-SR may update the EIS based on the received information at operation 1605.

At operation 1606, the SM-DP may receive a group device provisioning request from the MNO. This request may contain the EID list and ICCID list, requiring a profile installation, as well as a group ID. The SM-DP may transfer the received information to the SM-SR at operation 1607, and the SM-SR may transmit a trigger for group device provisioning to the device at operation 1608. In this case, a provisioning trigger is performed using MSISDN of the eUICC in a representative device (i.e., the primary device).

At operation 1609, the representative device may perform the above-discussed operations of the primary device and, using Wi-Fi or Bluetooth, transmit the provisioning trigger for installing profiles to the eUICCs embedded in the group devices.

At operations 1610 and 1611, the group devices receiving the profile installation trigger may download profiles from the SM-SR and SM-DP. If a profile download succeeds, the representative device may notify success in a profile download for the eUICCs of the group devices to the SM-SR at operations 1612 and 1613.

Meanwhile, the operation at operation 1608 may be modified in a process of transmitting the group device provisioning trigger from the SM-SR to the representative device (EID1).

Specifically, when transmitting the group provisioning trigger to the representative device, the SM-SR may insert scheduling information for a profile installation. Namely, the group provisioning trigger transmitted to the representative device may contain scheduling information for stating a profile download of the EID2 device when a profile download of the EID1 device is ended.

Alternatively, such scheduling information may be created by defining a time difference rather than generating a provisioning trigger for another profile download subsequent to a profile download. For example, after a given time elapses from transmission of the provisioning trigger of the EID1 device, the provisioning trigger of the EID2 device may be transmitted automatically.

Scheduling information inserted by the SM-SR during transmission of the group provisioning trigger may be not limited to the above examples and varied in other forms.

Figure 17:
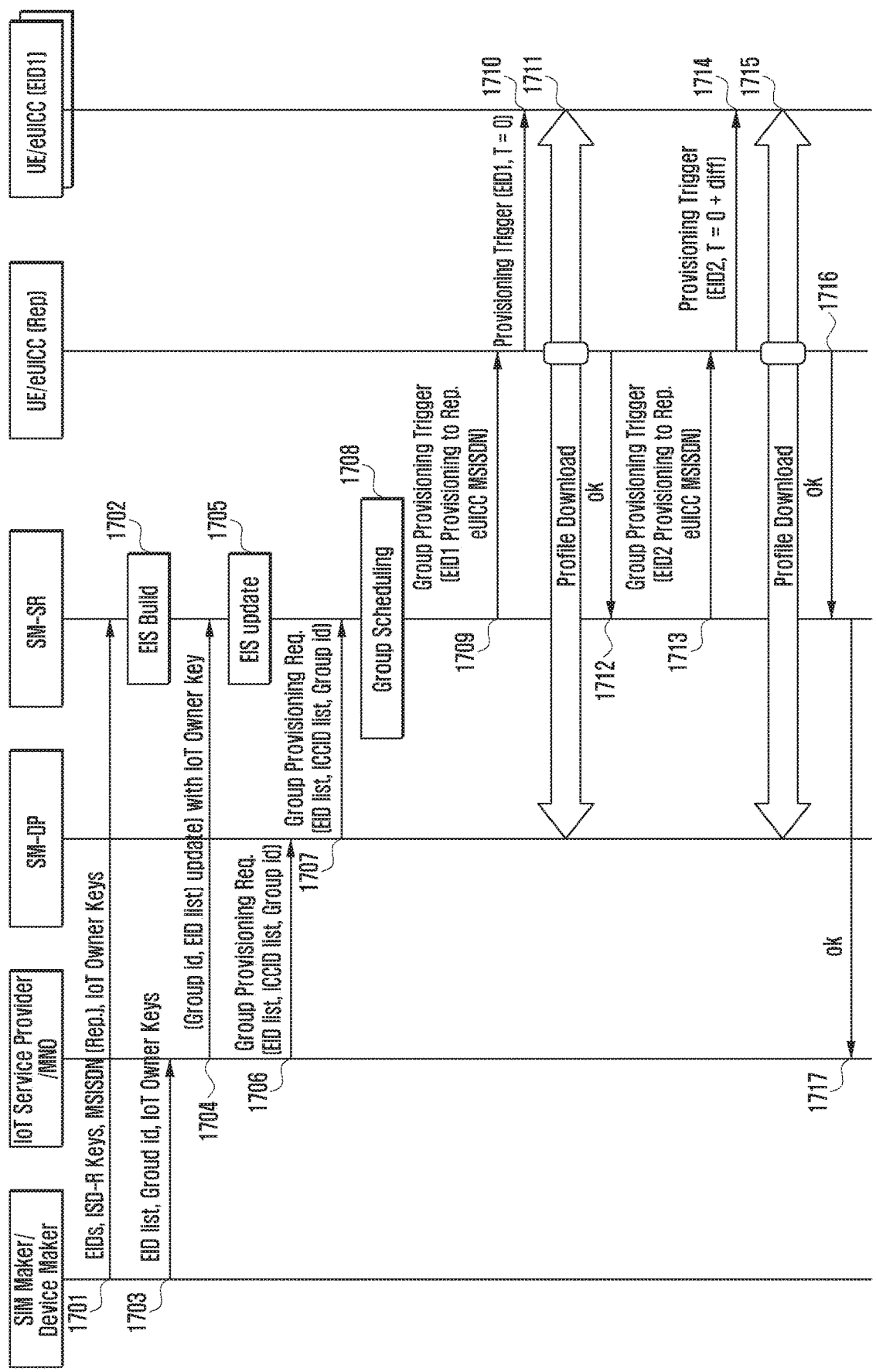
FIG. 17 is a diagram illustrating a profile download method for group devices according to an embodiment of the present disclosure.

FIG. 17 is a diagram illustrating a profile download method for group devices according to an embodiment of the present disclosure.

While in FIG. 16 the representative device triggers a group device profile download according to the group provisioning trigger containing scheduling information of the SM-SR, FIG. 17 shows that the SM-SR initiatively performs a group scheduling and the representative device merely performs a trigger for the group devices according to a trigger of the SM-SR.

Referring to FIG. 17, a profile download method is illustrated, such that operations 1701 to 1707 are the same as corresponding operations in FIG. 16, so that descriptions thereof will be omitted.

At operation 1708, the SM-SR may perform a group scheduling. As discussed in FIG. 16, this scheduling may be defined to perform sequential provisioning or to automatically trigger individual provisioning at a time difference, i.e., at regular intervals.

FIG. 17 shows a method for performing provisioning for the eUICCs of group devices at a time difference. At operation 1709, for provisioning of the device having the eUICC of the EID1, the SM-SR may transmit a group provisioning trigger to MSISDN of the representative device. Then the representative device transmits a provisioning trigger to the EID1 device at operation 1710.

After a profile download of the EID1 device is performed at operation 1711, the representative device may transmit an OK message for indicating a successful profile download to the SM-SR at operation 1712.

At operation 1713, for provisioning of the device having the eUICC of EID2 according to the scheduling, the SM-SR may transmit a trigger to the representative device. Then the representative device may transfer the trigger to the EID2 device at operation 1714 and, if a profile download succeeds at operation 1715, may transmit an OK message for indicating a successful profile download to the SM-SR at operation 1716. When provisioning for all group devices is completed in this manner, the SM-SR may transmit a message for indicating a successful profile download of the group devices to the IoT service provider/MNO at operation 1717.

Figure 18A:
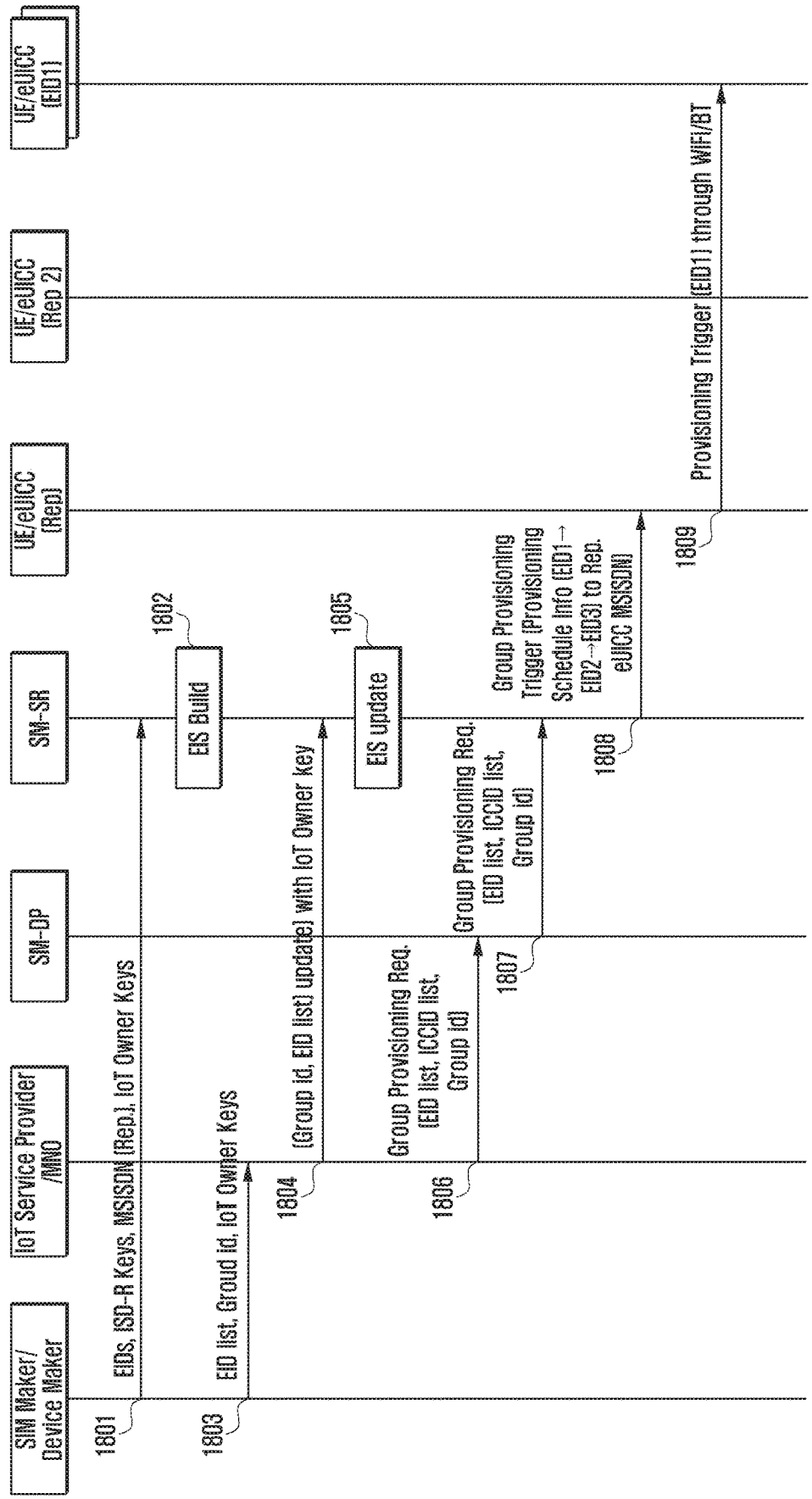
FIGS. 18A and 18B are diagrams illustrating a profile download method for group devices according to various embodiments of the present disclosure.
Figure 18B:
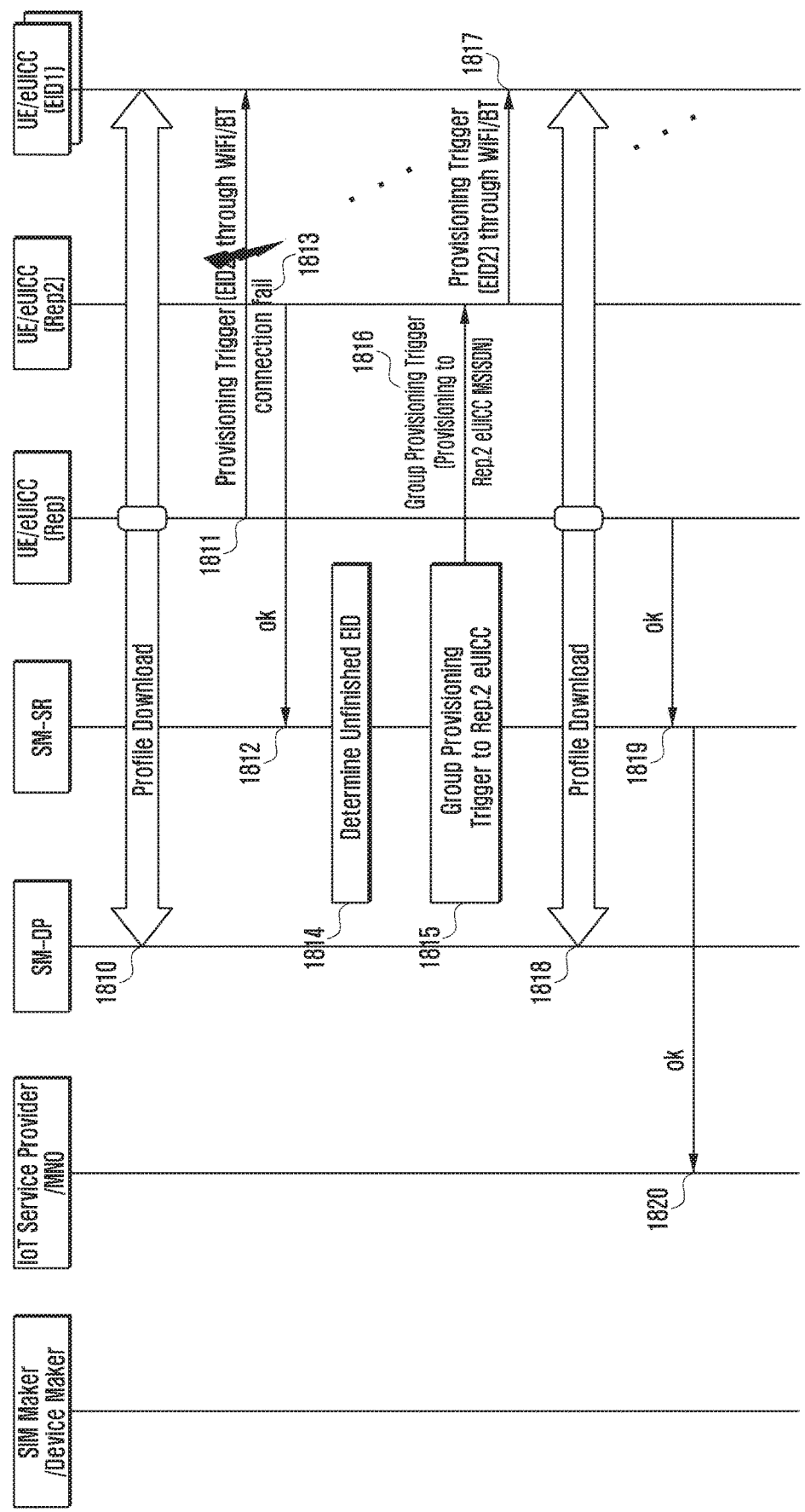

FIGS. 18A and 18B are diagrams illustrating a profile download method for group devices according to various embodiments of the present disclosure. FIGS. 18A and 18B show a method for performing provisioning at a second representative device (Rep.2) when errors occur in a transmission of a provisioning trigger at a representative device (Rep.). This allows a profile installation to be performed for other devices even though the representative device experiences a communication failure or problems.

Referring to FIG. 18A, a profile download method is illustrated, where operations 1801 to 1809 are the same as corresponding operations 1601 to 1609 in FIG. 16, so that descriptions thereof will be omitted. In case of FIGS. 18A and 18B, the SM-SR performs scheduling for provisioning in the order of EID1, 2 and 3 and transmits a group provisioning trigger having this scheduling to the representative device.

In this case, if a profile download for the EID1 device is performed at operation 1810, provisioning for the EID2 device should be performed according to scheduling and then an OK message for indicating the completion of all profile downloads should be received. Notwithstanding that, a provisioning trigger for the EID2 device at operation 1811 may fail in connection at operation 1813. Then, when an OK message is received at operation 1812, the SM-SR may determine at operation 1814 that a profile download for the EID2 is not completed.

Since the representative device fails in connection, the SM-SR transmits the group provisioning trigger to the eUICC of the second representative device at operation 1815. Here, the second representative device may be a device adjacent to the representative device. Alternatively, the second representative device may be a device selected in advance by the user, the IoT service provider, or the MNO. At operations 1816 and 1817, the second representative device may receive the group provisioning trigger from the SM-SR and then transmit the provisioning trigger to the EID2 device.

Additionally, when the profile download for the EID2 device is completed at operation 1818, the second representative device may transmit an OK message to the SM-SR at operation 1819. After all profile downloads are completed, the SM-SR may transmit an OK message to the IoT service provider/MNO at operation 1820.

Figure 19B:
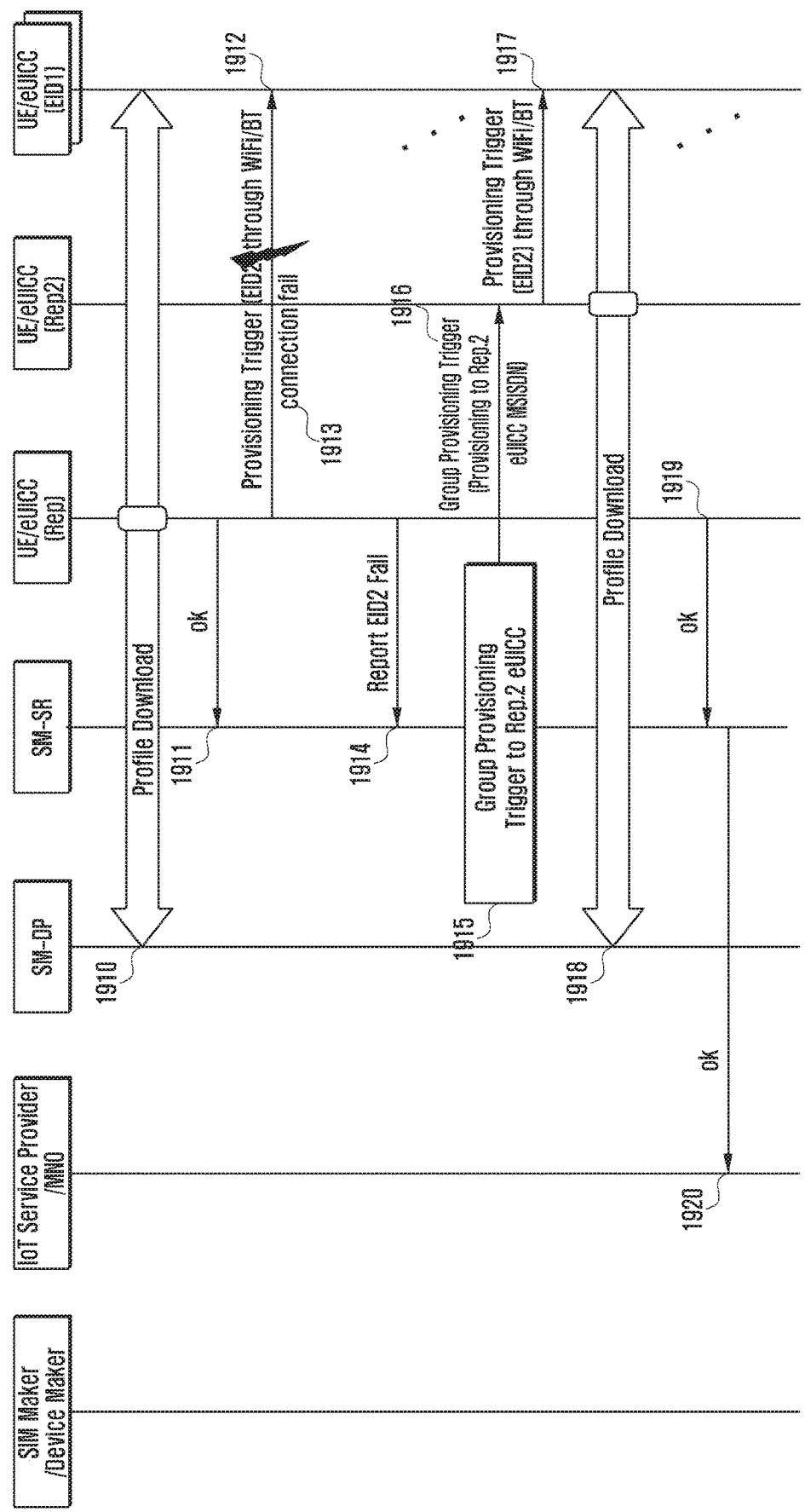

FIGS. 19A and 19B are diagrams illustrating a profile download method for group devices according to various embodiments of the present disclosure.

Referring to FIG. 19A, a profile download method is illustrated, wherein operations 1901 to 1909 are the same as corresponding operations 1801 to 1809 in FIG. 18A, so that descriptions thereof will be omitted.

After a profile download for the EID1 device is ended at operation 1910, the representative device may transmit an OK message for indicating the end of the profile download for the EID1 to the SM-SR at operation 1911. Further, according to scheduling information, the representative device may transmit a provisioning trigger for the EID2 device at operation 1912. However, if the provisioning trigger for the EID2 device fails in connection at operation 1913, the representative device may report a failure in a trigger for the EID2 to the SM-SR at operation 1914.

At operation 1915, the SM-SR may transmit a group provisioning trigger to instruct provisioning for the EID2 device to the second representative device and in operation 1916 the second representative device receives the group provisioning trigger. Then the second representative device transmits a provisioning trigger for the EID2 device at operation 1917, and the EID2 device downloads a profile at operation 1918. When this profile download is completed, the representative device may transmit an OK message for indicating the end of profile installation for the EID2 device to the SM-SR at operation 1919. After all profile downloads are completed, the SM-SR may transmit an OK message to the IoT service provider/MNO at operation 1920.

By comparing FIGS. 18A and 18B with FIGS. 19A and 19B, the SM-SR recognizes a connection fail when the OK message is received in case of FIGS. 18A and 18B or when a failure is reported directly in case of FIGS. 19A and 19B.

FIG. 20 is a diagram illustrating a profile download method for group devices according to an embodiment of the present disclosure.

Referring to FIG. 20, a profile download method is illustrated, wherein operations 2001 to 2007 are the same as corresponding operations 1701 to 1707 in FIG. 17, so that descriptions thereof will be omitted.

At operation 2008, the SM-SR transmits a group provisioning trigger having scheduling of sequential provisioning of EID1, EID2 and EID3 to the representative device. The connection of the group provisioning trigger may fail at operation 2009. In this case, there is a need for selecting a new representative device, and a certain device may have a seed for the representative device.

At operation 2010, the SM-SR may transmit a trigger for downloading a provisioning profile to the new representative device having a seed. At this time, an EID for the new representative device and a provisioning profile indicator may be contained. At operation 2011, the new representative device may download a provisioning profile and transmit a profile download trigger for the EID1 to the EID1 device. At operation 2012, the EID1 device may download a profile and at operation 2013 the EID1 device may set up a provisioning profile. Thereafter, the SM-SR may update EIS in operation 2014.

Figure 21:
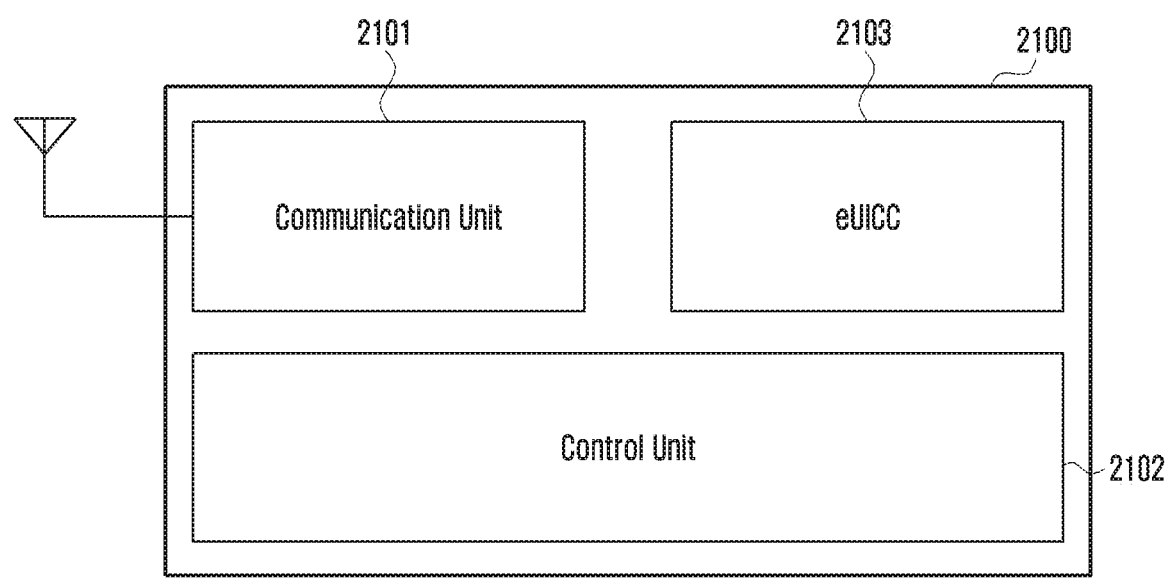
FIG. 21 is a block diagram illustrating a device according to an embodiment of the present disclosure.

FIG. 21 is a block diagram illustrating a device according to an embodiment of the present disclosure.

Referring to FIG. 21 a device 2100 is illustrated, where the device 2100 according to an embodiment of this disclosure may include a communication unit 2101, a control unit 2102, and an eUICC 2103. The device 2100 may be a primary device or a group device (or a device paired to the primary device, IoT device, wearable device).

The control unit 2102 may obtain information associated with profiles to be installed in the eUICC of two or more second devices from the profile management server through the communication unit 2101. Further, the control unit 2102 may identify (receive or determine) an eUICC ID of at least one of the second devices and then transmit one of the profiles to the eUICC of the device corresponding to the obtained eUICC ID.

If the device 2100 is a primary device, the device 2100 is configured to as below.

The control unit 2102 of a primary device is configured to receive at least one profile from a profile management server, wherein each of the received at least one profile is to be installed in each electronic card of at least one device (group device), to obtain at least one electronic card ID of the at least one device, and to transmit, to the at least one device, the at least one profile corresponding to the obtained at least one electronic card ID. Also, the electronic card of the device may be embedded in the device physically and the electronic card of the primary device (a terminal) may be embedded in the primary device physically. Further, the electronic card includes a UICC.

Also the profile includes network access certification information. Each of the at least one profile corresponds to each of the at least one device. The at least one profile includes a common profile for the at least one device and at least one personal parameter corresponding to each of the at least one device.

The control unit 2102 of a primary device is configured to decrypt the received profile, to encrypt the decrypted profile for the at least one device, and to transmit the encrypted profile to the at least one device corresponding to the obtained electronic card ID.

The electronic card of the device receives the profile and installs the received profile, wherein the electronic card ID is obtained based on connection between the terminal and the at least one device using Bluetooth or Wi-Fi. Each of the received at least one profile is transmitted to each of the at least one device paired with the terminal.

The control unit 2102 of a primary device is configured to pair with the at least one device, and to transmit, to the profile management server, a profile request for the at least one device paired with the terminal.

The control unit 2102 of a primary device is configured to group the at least one device paired with the terminal, and to transmit, to the profile management server, a profile request for the grouped devices based on subscription information of the terminal and the grouped devices.

If the device 2100 is a group device, the device 2100 is configured to as below.

The control unit 2102 of the group device is configured to transmit an ID of the electronic card to a terminal and to receive a profile corresponding to the ID of the electronic card from the terminal, and to control the electronic card of the group device to install the received profile.

Also, the profile is downloaded to the terminal from a profile management server, and wherein the electronic card is embedded in the group device physically, and the electronic card includes a UICC.

The profile includes network access certification information. The profile includes a common profile for a plurality of group devices including the group device and a personal parameter corresponding to the group device. The ID of the electronic card is transmitted based on connection between the terminal and the group device using Bluetooth or Wi-Fi. The profile is received when the group device is paired with the terminal.

The group device includes at least one of wearable device or IoT device.

Figure 22:
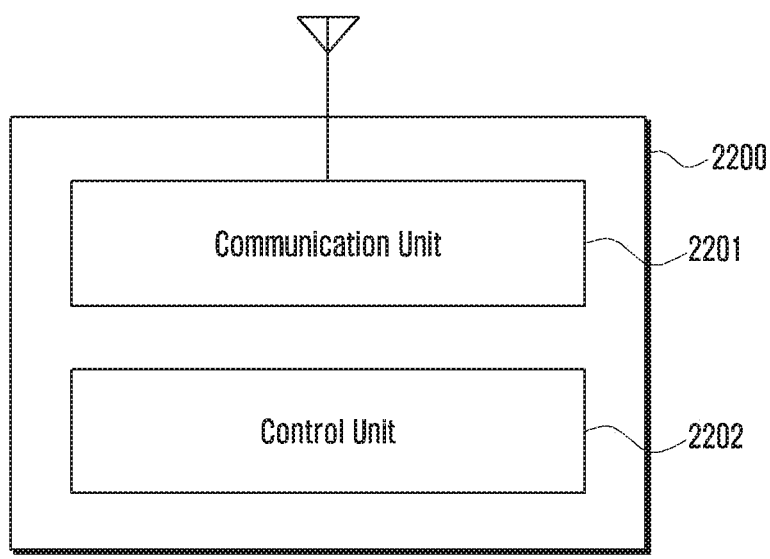
FIG. 22 is a block diagram illustrating a server according to an embodiment of the present disclosure.

FIG. 22 is a block diagram illustrating a server according to an embodiment of the present disclosure.

Referring to FIG. 22, a server 2200 is illustrated, where the server 2200 may include a communication unit 2201 and a control unit 2202. The control unit 2202 may receive a request for a profile installation from one of a plurality of devices. This request may include an ID list of the eUICCs embedded in the plurality of devices. Additionally, the control unit 2202 may receive encrypted information associated with profiles corresponding to the installation request from the profile creation server and then transmit, to the device, the received profile information and scheduling information for transmitting profiles to the eUICCs embedded in the plurality of devices.

The control unit 2202 is configured to receive, from a terminal (a primary device), information to request at least one profile, wherein each of the requested at least one profile is to be installed in each electronic card of at least one device (at least one group device), and to transmit, to the terminal, the at least one profile based on the information.

Also, the electronic card is embedded in the device physically, and the electronic card includes a UICC. The electronic card receives the profile and installs the received profile.

The profile includes network access certification information. The each of the at least one profile corresponds to each of the at least one device. The at least one profile includes a common profile for the at least one device and at least one personal parameter corresponding to each of the at least one device.

The device includes at least one of wearable device or IoT device.

Hereinafter, with regard to a profile download for group devices discussed previously with regard to FIGS. 4 to 15, operations performed by each entity (i.e., the primary device, the secondary device, the SM-DP, and the SM-SR) will be described with reference to FIGS. 23 to 34.

Figure 23:
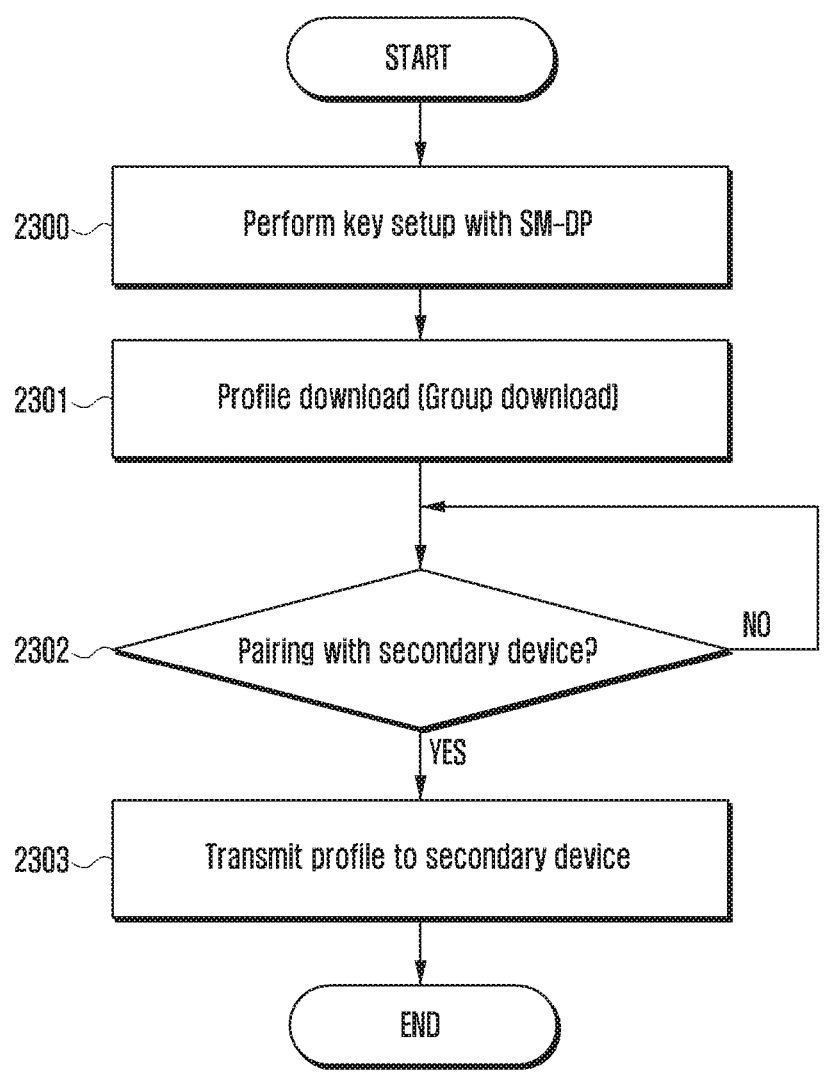
FIG. 23 is a flow diagram illustrating operations of a primary device in a profile download method for group devices according to an embodiment of the present disclosure.

FIG. 23 is a flow diagram illustrating operations of a primary device in a profile download method for group devices according to an embodiment of the present disclosure.

Referring to FIG. 23, a flow diagram is illustrated, such that at operation 2300, a primary device performs a key setup with the SM-DP. Then the SM-DP may create N profiles requested by the MNO, and the primary device may download the created N profiles at operation 2301. Specifically, this process of downloading a plurality of profiles at the primary device may be varied according to various embodiments of the present disclosure.

At operation 2302, the primary device may determine whether pairing with the secondary device occurs. At this time, a security setup may be performed between the primary device and the secondary device. If pairing with the secondary device does not occur, then operation 2302 is repeated. However, if pairing with the secondary device occurs, the primary device may encrypt a profile to be transmitted and then transmit the encrypted profile to the secondary device at operation 2303.

Figure 24:
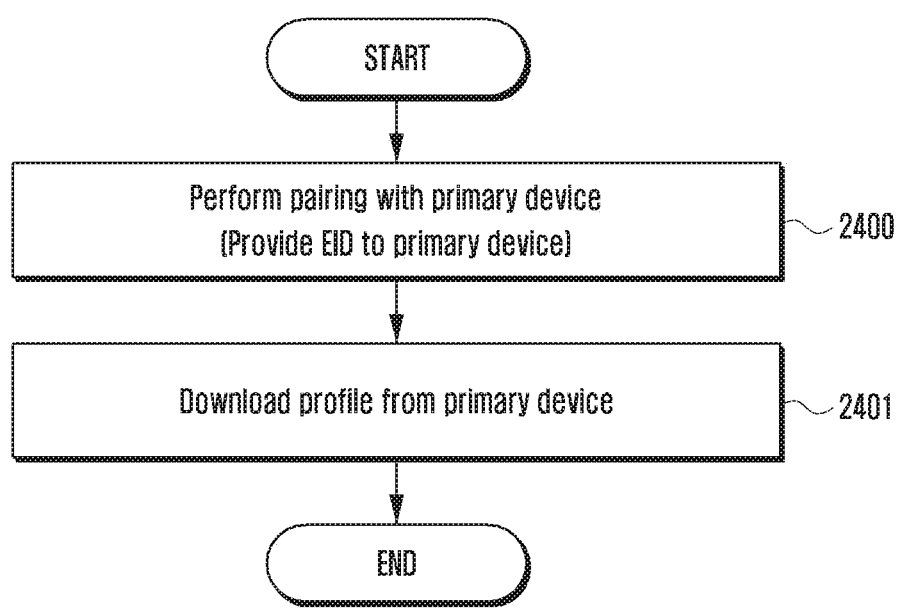
FIG. 24 is a flow diagram illustrating operations of a secondary device in a profile download method for group devices according to an embodiment of the present disclosure.

FIG. 24 is a flow diagram illustrating operations of a secondary device in a profile download method for group devices according to an embodiment of the present disclosure.

Referring to FIG. 24, a flow diagram is illustrated, such that at operation 2400, a secondary device performs pairing with a primary device. Such pairing may be performed using Bluetooth or Wi-Fi, for example, but not limited thereto.

When pairing with the primary device is performed, the secondary device may offer an EID of the eUICC embedded therein to the primary device together with unique MAC information thereof.

Thereafter, if the primary device downloads a plurality of profiles, the secondary device may download a specific profile assigned to its own EID from the primary device in operation 2401.

Figure 25:
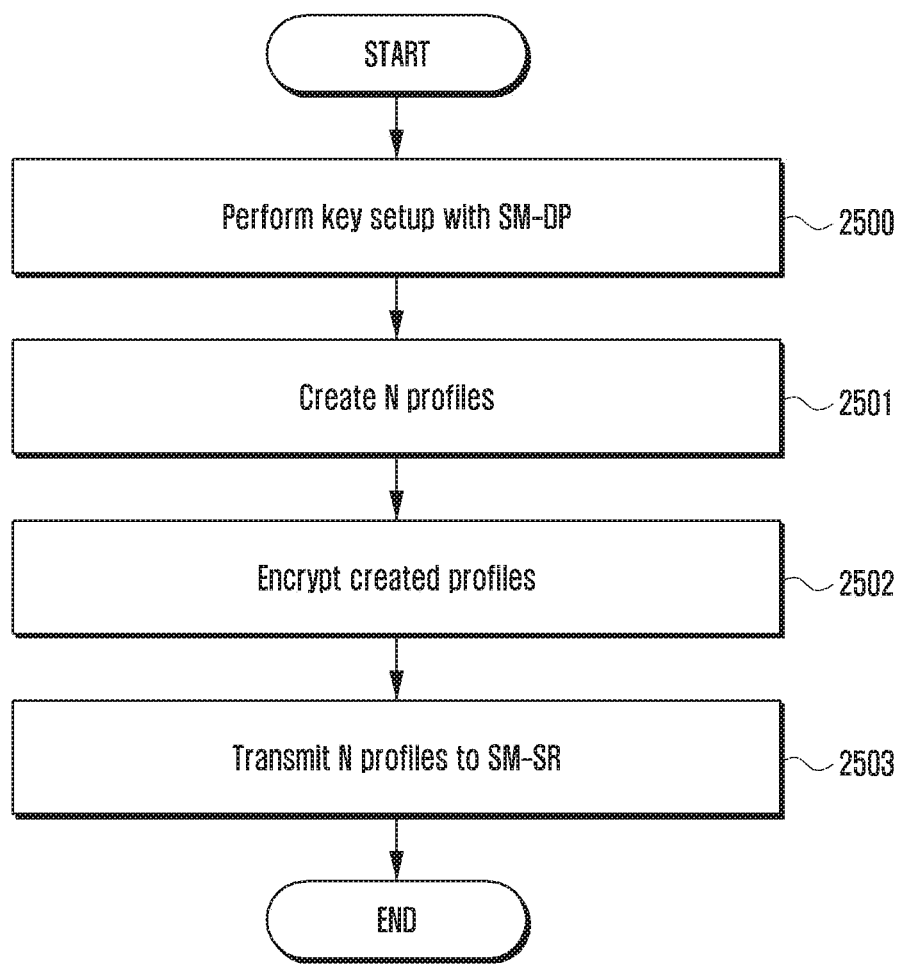
FIG. 25 is a flow diagram illustrating operations of a Subscription Manager Data Preparation (SM-DP) in a profile download method for group devices according to an embodiment of the present disclosure.

FIG. 25 is a flow diagram illustrating operations of an SM-DP in a profile download method for group devices according to an embodiment of the present disclosure.

Referring to FIG. 25, a flow diagram is illustrated, such that at operation 2500, the SM-DP performs a key setup with the primary device. Meanwhile, the SM-DP may receive a request for creating a group profile from the MNO. At this time, the MNO offers the SM-DP the number of required profiles as well as EID of the primary device. The SM-DP creates N profiles at operation 2501 and performs encryption of the created profiles at operation 2502.

At operation 2503, the SM-DP may transmit the created N profiles to the SM-SR. Instead of creating N individual profiles in FIG. 25, the SM-DP may create one common profile and N personal parameters.

Figure 26:
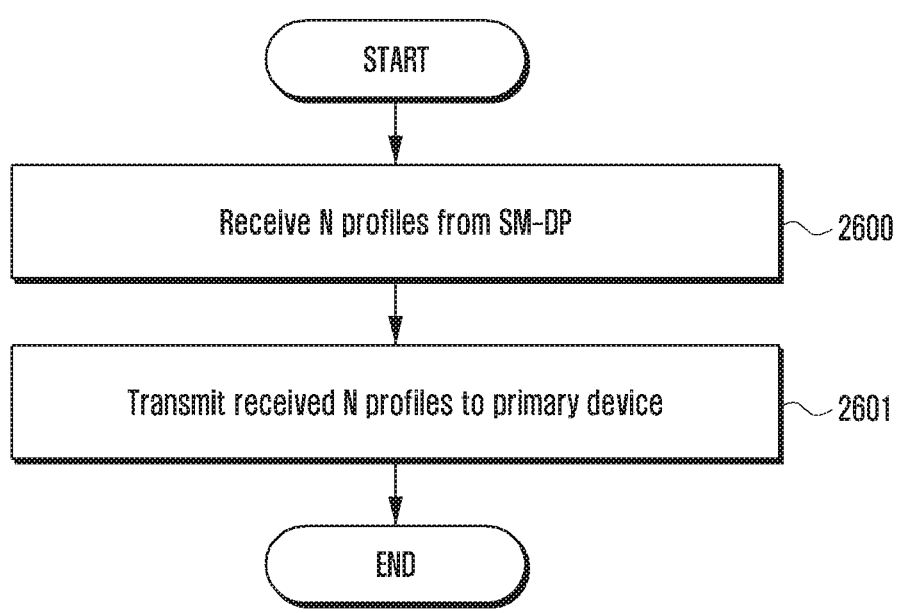
FIG. 26 is a flow diagram illustrating operations of a Subscription Manager Secure Routing (SM-SR) in a profile download method for group devices according to an embodiment of the present disclosure.

FIG. 26 is a flow diagram illustrating operations of an SM-SR in a profile download method for group devices according to an embodiment of the present disclosure.

Referring to FIG. 26, a flow diagram is illustrated, such that at operation 2600, the SM-SR may receive N profiles created at the SM-DP. At this time, the SM-SR may receive N individual profiles or alternatively receive one common profile and N personal parameters.

Optionally, the SM-SR may build an EIS based on received group information. Thereafter, at operation 2601, the SM-SR may transmit the received N profiles to the primary device through a verification process of the device.

Figure 27:
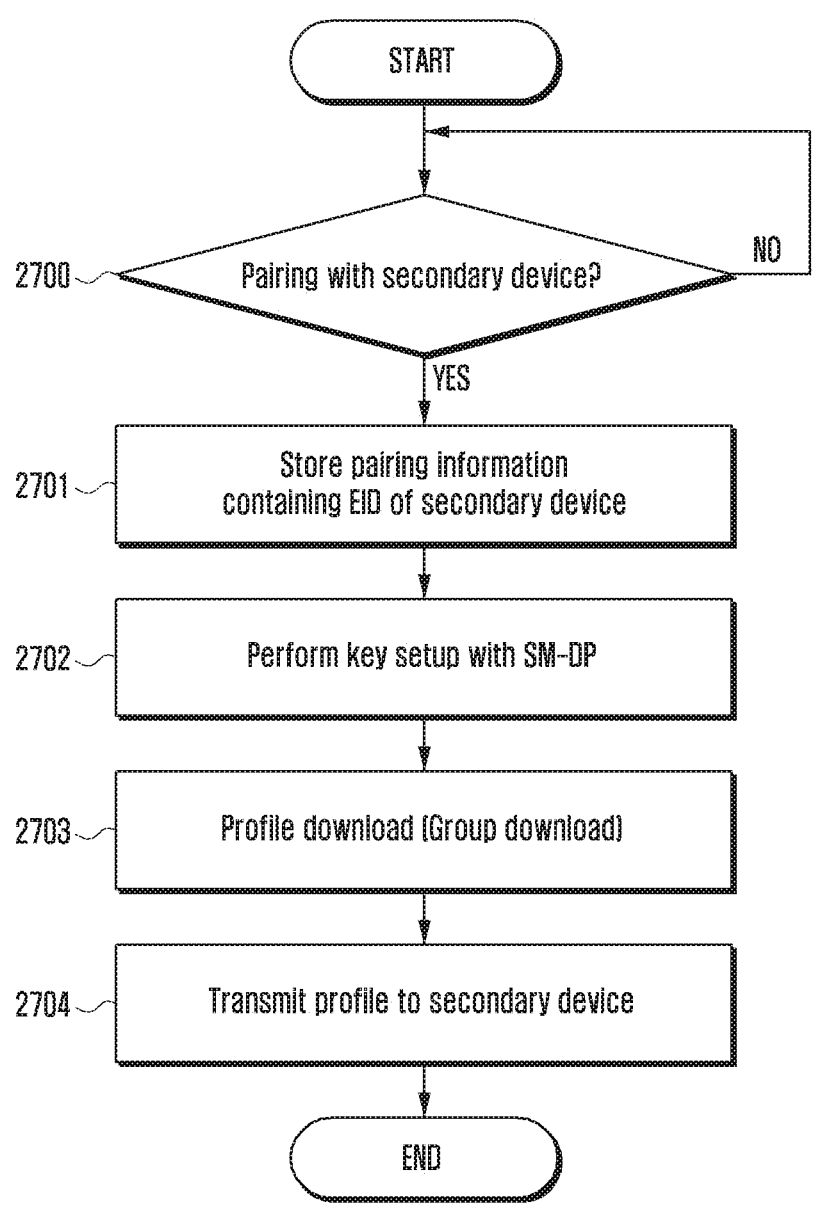
FIG. 27 is a flow diagram illustrating operations of a primary device in a profile download method for group devices according to an embodiment of the present disclosure.
Figure 28:
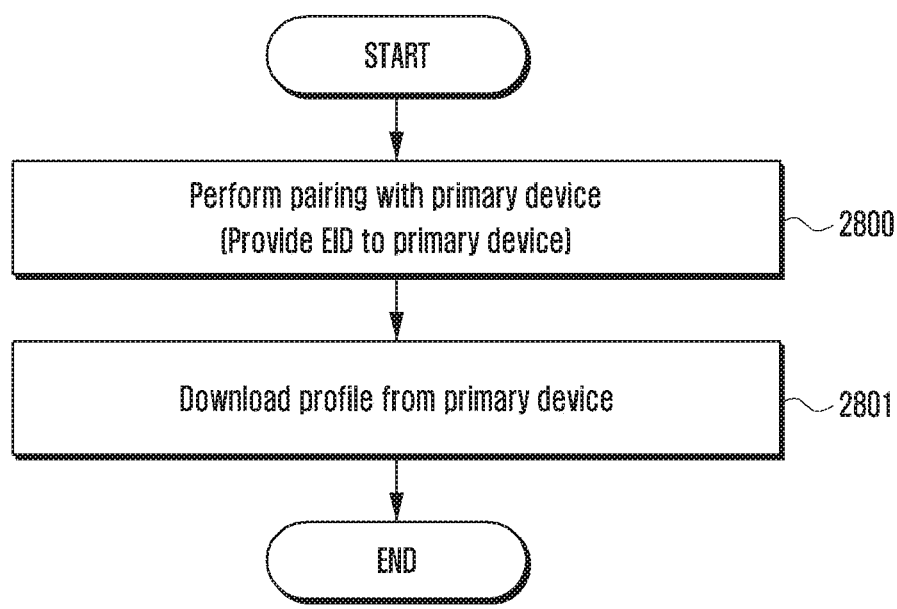
FIG. 28 is a flow diagram illustrating operations of a secondary device in a profile download method for group devices according to an embodiment of the present disclosure.

FIGS. 27 and 28 show a profile download method for group devices according to an embodiment of the present disclosure. In this method according to an embodiment of the present disclosure, the SM-DP and the SM-SR have the same operations as those in another embodiment of the present disclosure shown in FIGS. 25 and 26. Therefore, related descriptions will be omitted herein.

Differences in embodiments of the present disclosure may be that pairing has been already made between the primary device and the secondary device before the primary device downloads a profile from the SM-DP. In this case, the primary device does not need to wait for pairing so as to transfer a profile to the secondary device. A profile download is performed after pairing, and the primary device can decrypt, re-encrypt and install a profile as soon as the profile is downloaded.

FIG. 27 is a flow diagram illustrating operations of a primary device in a profile download method for group devices according to an embodiment of the present disclosure.

Referring to FIG. 27, a flow diagram is illustrated, such that at operation 2700, a primary device may determine whether pairing with a secondary device occurs.

Such pairing may be performed using Bluetooth or Wi-Fi, for example, but not limited thereto. If the pairing with the secondary device does not occur, then operation 2700 is repeated. However, when pairing with the secondary device occurs, the primary device may receive, from the secondary device, pairing information containing EID of the eUICC embedded in the secondary device and MAC information of the secondary device and then store the received information at operation 2701.

At operation 2702, the primary device performs a key setup with the SM-DP. Thereafter, the SM-DP may create N profiles requested by the MNO, and the primary device may download the created N profiles at operation 2703. Specifically, this process of downloading a plurality of profiles at the primary device may be varied according to various embodiments. At operation 2704, the primary device may encrypt a profile to be transmitted and then transmit the encrypted profile to the secondary device.

FIG. 28 is a flow diagram illustrating operations of a secondary device in a profile download method for group devices according to an embodiment of the present disclosure.

Referring to FIG. 28, a flow diagram is illustrated, such that at operation 2800, a secondary device may perform pairing with a primary device. Such pairing may be performed using Bluetooth or Wi-Fi, for example, but not limited thereto. When pairing with the primary device is performed, the secondary device may offer an EID of the eUICC embedded therein to the primary device together with unique MAC information thereof.

At operation 2801, the secondary device performs a profile download from the primary device.

Thereafter, although not shown, such a profile installed in the secondary device may be managed by the primary device. In various embodiments of the present disclosure, the primary device may store an encryption key used when installing profiles in the secondary devices. Additionally, after the installation of profiles, the primary device may manage, using the encryption key, the profiles installed in the secondary devices. Specifically, the primary device may delete profiles installed in the secondary devices. Also, the primary device may disable or enable such profiles installed in the secondary devices.

Further, the primary device may install the same profile having the same phone number and the same IMSI value in both the primary device and the secondary device, and control one profile only to be enabled at the same time. Namely, only one of the primary device and the secondary device, having the same profiles installed therein, is enabled at the same time so that the user can select a device to be used. For selectively enabling only one of both devices, the primary device may transfer an enable or disable control command to the secondary device, or schedule information may be shared in advance. Alternatively, priorities may be defined to enable a specific device having the highest priority.

Figure 29:
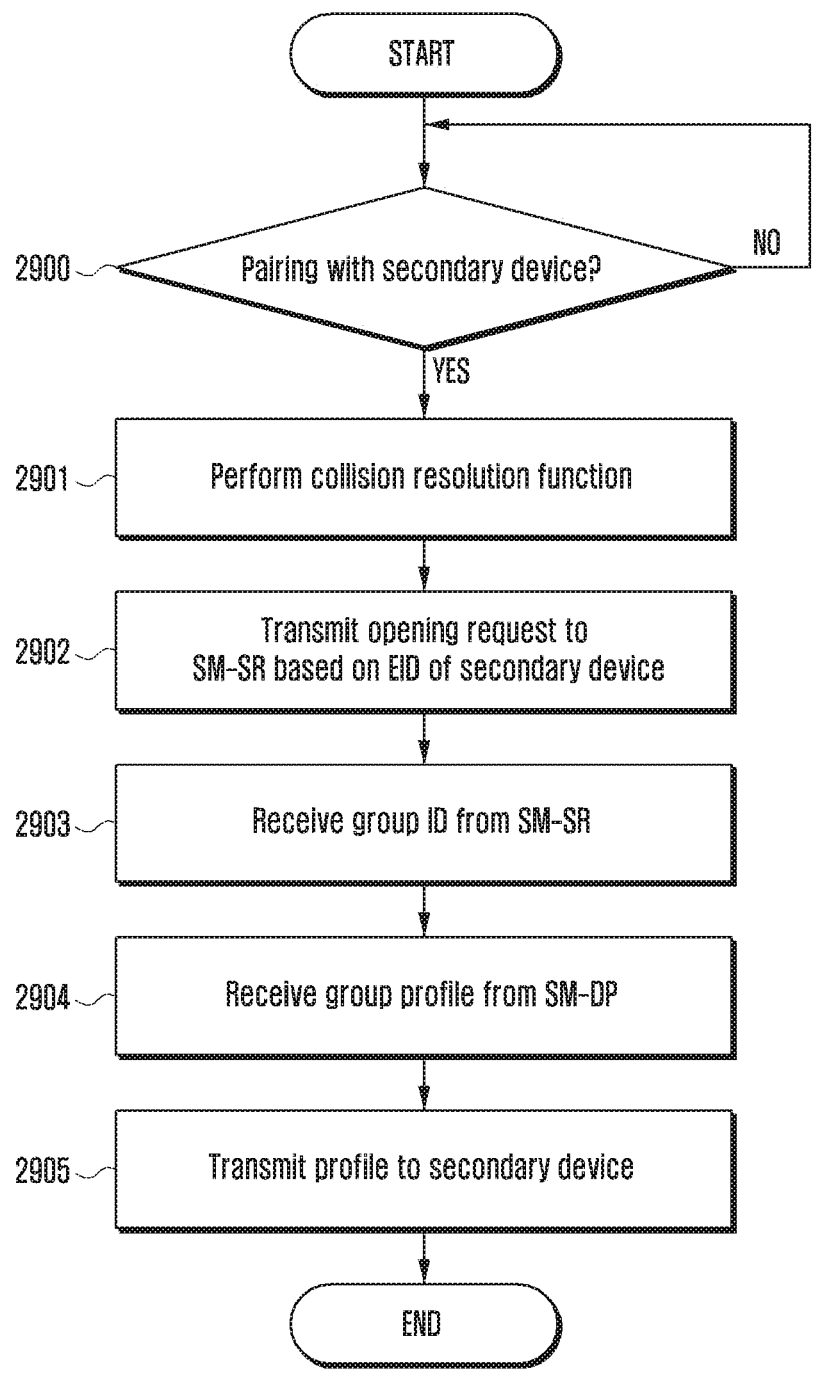
FIG. 29 is a flow diagram illustrating operations of a primary device in a profile download method for group devices according to an embodiment of the present disclosure.

FIG. 29 is a flow diagram illustrating operations of a primary device in a profile download method for group devices according to an embodiment of the present disclosure.

Referring to FIG. 29, a flow diagram is illustrated, such that at operation 2900, a primary device may determine whether pairing with a secondary device occurs. Such pairing may occur using Bluetooth or Wi-Fi, for example, but not limited thereto. If pairing with the secondary device does not occur, then operation 2900 is repeated. However, when pairing with the secondary device occurs, the primary device may receive, from the secondary device, an EID of the eUICC embedded in the secondary device and MAC information of the secondary device and then store the received information.

At this time, the primary device may perform a collision resolution function at operation 2901. This function may be selected by the user on UI of the primary device. Namely, the user can see a list of secondary devices for pairing with the primary device on the UI of the primary device and delete a duplicate item from the list. The user may be named as a group owner for the primary device and the pairing secondary devices. When the collision resolution function is performed, the primary device may retrieve or store required data from an additional server for managing multi devices or family relation.

At operation 2902, the primary device may transmit a request for a group opening to the SM-SR. At this time, an EID list of the eUICC embedded in the secondary device may be also offered.

At operation 2903, when the SM-SR creates a group ID and, using this group ID, transmits a group opening request to the MNO, the primary device may receive the group ID from the SM-SR.

Thereafter, the primary device may receive group profiles from the SM-DP at operation 2904. Then the primary device may transmit the received group profiles to respective EIDs of the secondary devices at operation 2905.

Figure 30:
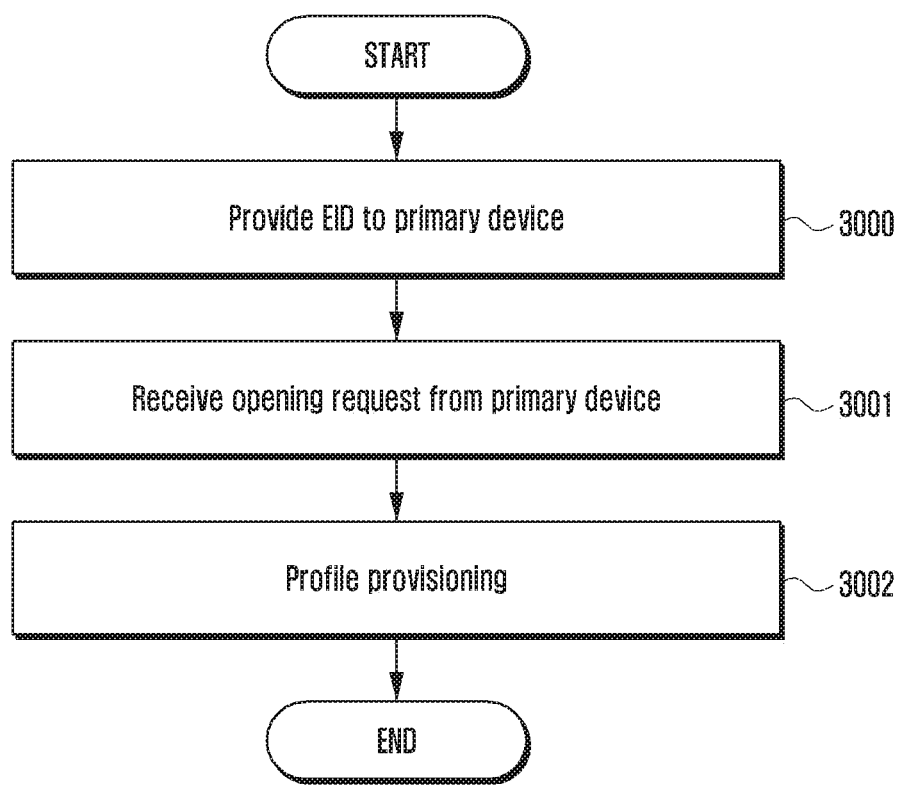
FIG. 30 is a flow diagram illustrating operations of a secondary device in a profile download method for group devices according to an embodiment of the present disclosure.

FIG. 30 is a flow diagram illustrating operations of a secondary device in a profile download method for group devices according to an embodiment of the present disclosure.

Referring to FIG. 30, a flow diagram is illustrated, such that a secondary device may offer an EID of the eUICC embedded in a primary device through pairing with the primary device in operation 3000. Thereafter, the primary device offers the EID list of the secondary device to the SM-SR, and the SM-SR transmits a group opening request having a created group ID to the MNO and the primary device. Then the secondary device may receive the group opening request from the primary device at operation 3001. At operation 3002, using a profile received by the primary device, the secondary device may perform profile provisioning.

Figure 31:
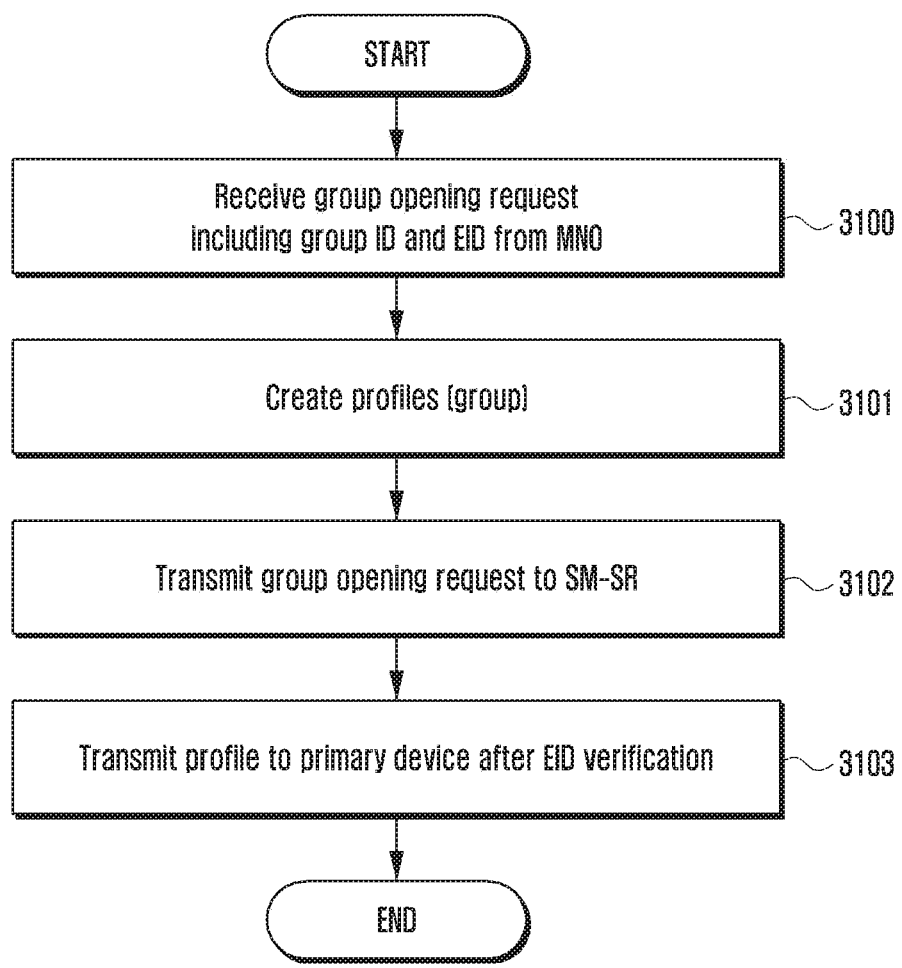
FIG. 31 is a flow diagram illustrating operations of an SM-DP in a profile download method for group devices according to an embodiment of the present disclosure.

FIG. 31 is a flow diagram illustrating operations of an SM-DP in a profile download method for group devices according to an embodiment of the present disclosure.

Referring to FIG. 31, a flow diagram is illustrated, such that at operation 3100, the SM-DP receives, from the MNO, a group opening request containing a group ID and an EID list. Additionally, at operation 3101, the SM-DP creates a plurality of profiles corresponding to the number of EIDs.

Then the SM-DP may transmit a group opening request to the SM-SR at operation 3102. The SM-SR may transfer this request to the primary device and also perform authentication with the primary device. Various types of authentication may be used. If EID verification succeeds, the SM-DP may transmit a profile to the primary device at operation 3103.

Figure 32:
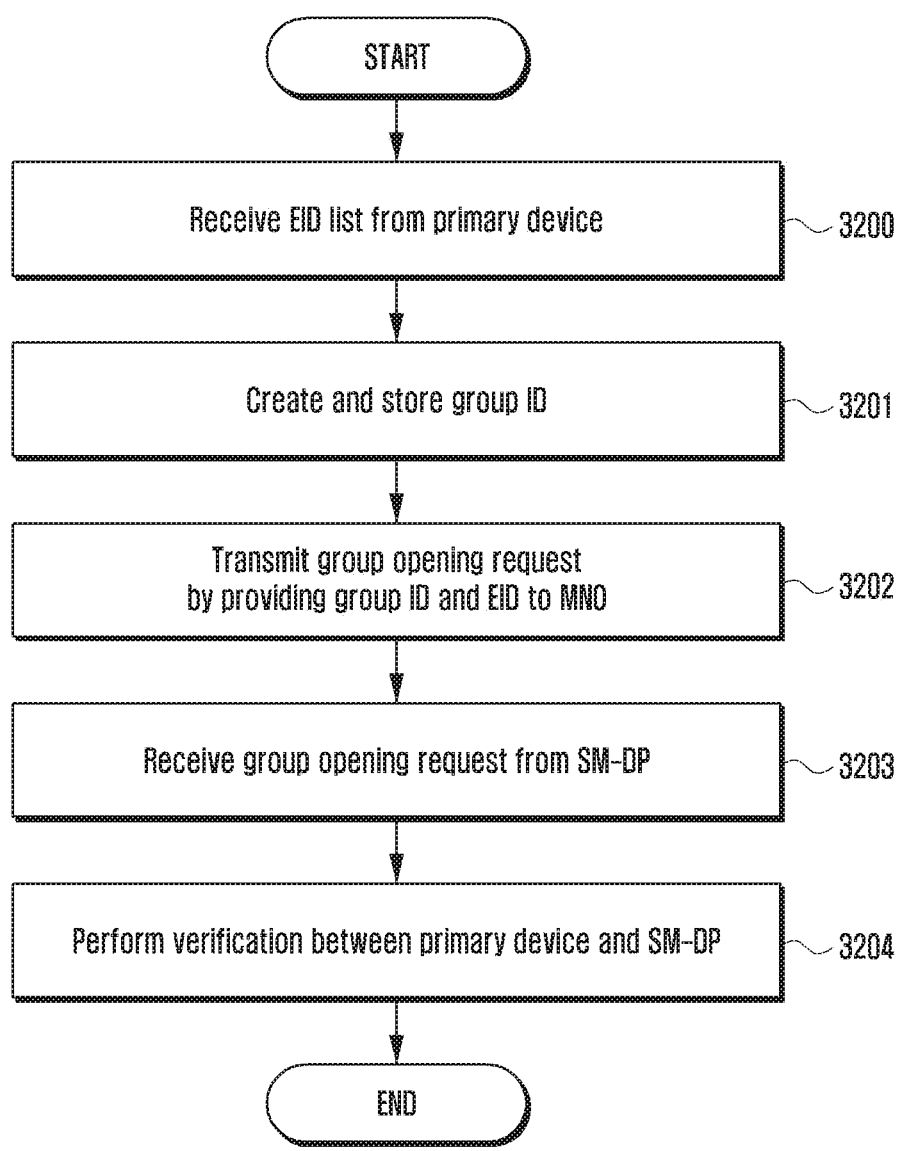
FIG. 32 is a flow diagram illustrating operations of an SM-SR in a profile download method for group devices according to an embodiment of the present disclosure.

FIG. 32 is a flow diagram illustrating operations of an SM-SR in a profile download method for group devices according to an embodiment of the present disclosure.

Referring to FIG. 32, a flow diagram is illustrated, such that at operation 3200, an SM-SR may receive an EID list from a primary device. This list may be offered after a duplicate item is removed by a collision resolution function.

At operation 3201, the SM-SR may create and store a group ID for the EID list and build EIS by storing them.

Thereafter, to perform profile provisioning of the device, the SM-SR may transmit a group opening request to the MNO by offering the created group ID and the EID list at operation 3202. Then the SM-DP may create a profile in response to a request of the MNO, and the SM-SR may receive a group opening request for offering the profile to the device from the SM-DP at operation 3203. At operation 3204, the SM-SR may perform verification for a profile download between the primary device and the SM-DP.

Meanwhile, in an embodiment of the present disclosure, the secondary device transmits preinstalled or predefined profile information to the MNO or the SM server through the primary device. In this case, the SM-DP or the SM-SR merely performs an operation of receiving such profile information preinstalled or predefined in the secondary device verified in connection with the MNO, rather than performing a special operation associated with provisioning. Therefore, operations of the SM-DP and the SM-SR will be not shown, and operations of the primary device and the secondary device will be described hereinafter with reference to FIGS. 33 and 34.

Figure 33:
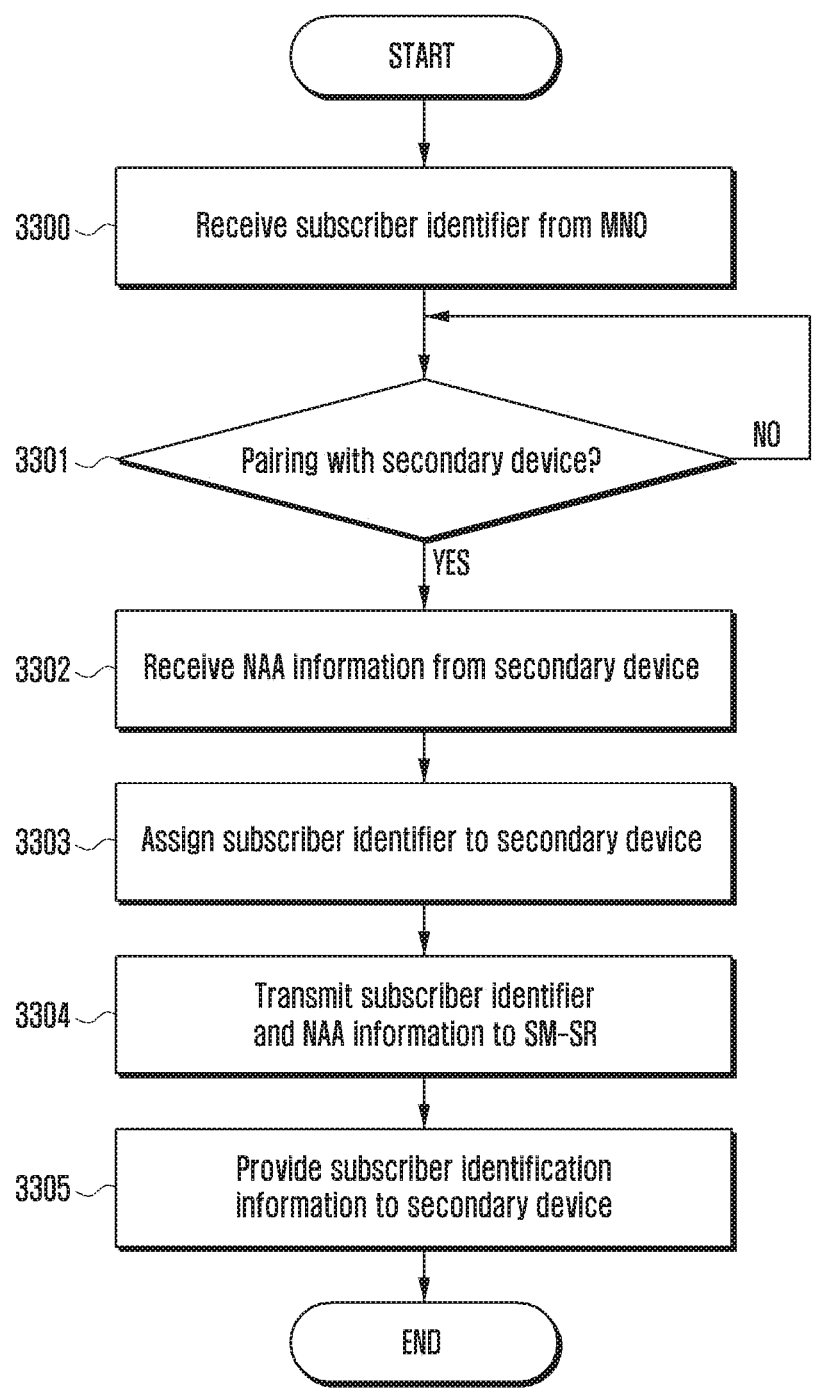
FIG. 33 is a flow diagram illustrating operations of a primary device in a profile download method for group devices according to an embodiment of the present disclosure.

FIG. 33 is a flow diagram illustrating operations of a primary device in a profile download method for group devices according to an embodiment of the present disclosure.

Referring to FIG. 33, a flow diagram is illustrated, such that at operation 3300, a primary device may receive a subscriber ID from an MNO. In this case, the primary device may share the received subscriber ID with a secondary device, and the subscriber ID may be an IMSI. The subscriber ID offered to the primary device by the MNO may have the following format, for example:

Subscriber Identifier (450081234567*XXX*)=Subscriber part (450081234567)+Device part (*XXX*).

At operation 3301, the primary device may determine whether pairing with the secondary device occurs. Such pairing may occur using Bluetooth or Wi-Fi, for example, but not limited thereto. If the pairing does not occur, then operation 3301 is repeated. However, when pairing with the secondary device occurs, the primary device may receive, from the secondary device, an EID of the eUICC embedded in the secondary device and MAC information of the secondary device and then store the received information.

The secondary device may have an NAA and an encryption key which are mounted in advance. At operation 3302, the primary device may receive NAA information from the secondary device. This NAA information may contain an algorithm and an encryption key, and the primary device may assign the subscriber ID to the NAA information at operation 3303. In this case, if the subscriber part of the subscriber ID received from the eUICC of a certain device is the same as offered to the primary device by the MNO, the MNO may regard and authenticate the device as one of group devices.

At operation 3304, the primary device may transmit the NAA information with an assigned subscriber ID to the SM-SR. Further, this information may be transferred to the SM-DP and the MNO. At operation 3305, the primary device may also provide the subscriber ID to the secondary device.

Figure 34:
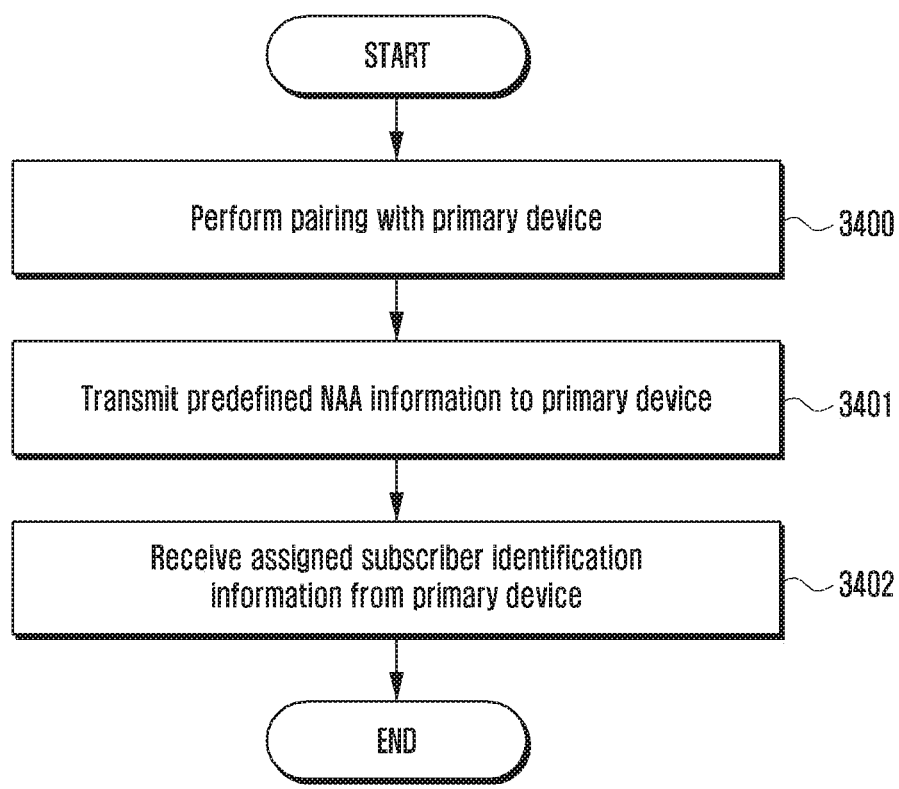
FIG. 34 is a flow diagram illustrating operations of a secondary device in a profile download method for group devices according to an embodiment of the present disclosure.

FIG. 34 is a flow diagram illustrating operations of a secondary device in a profile download method for group devices according to an embodiment of the present disclosure.

Referring to FIG. 34, a flow diagram is illustrated, such that at operation 3400, a secondary device may perform pairing with a primary device. Such pairing may occur using Bluetooth or Wi-Fi, for example, but not limited thereto. When pairing with the primary device occurs, the secondary device may transmit, to the primary device, an EID of the eUICC embedded therein and MAC information thereof.

The secondary device may have an NAA and an encryption key which are mounted in advance. At operation 3401, the secondary device may transmit NAA information to the primary device. Thereafter, as discussed above in FIG. 33, the NAA information may be offered to the MNO, and the primary device may offer the secondary device the subscriber ID assigned to the secondary device. Then, at operation 3402, the secondary device may receive the subscriber ID from the primary device.

As fully described hereinbefore, various embodiments of the present disclosure may simply install profiles in the eUICCs embedded in a plurality of devices.

Further, according to the present disclosure, smart devices may be easily managed using a group ID.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal comprising:
   a transceiver; and
   at least one processor coupled with the transceiver and configured to:
      pair the terminal and a device comprising an embedded universal integrated circuit card (eUICC),
      obtain subscription information for the terminal and the device,
      transmit, to a profile management server, a request message for a profile corresponding to an identifier of the eUICC of the device based on the subscription information for the terminal and the device,
      receive, from the profile management server, the profile corresponding to the identifier of the eUICC of the device, wherein the profile corresponding to the identifier of the eUICC of the device includes a software packaging comprising at least one of a file system, an authentication key value or network access certification information, and
      transmit, to the device, the profile corresponding to the identifier of the eUICC of the device.

2. The terminal of claim 1, wherein one payment plan is shared for the terminal and the device based on the subscription information for the terminal and the device.

3. The terminal of claim 1, wherein same phone number is used for the terminal and the device, and
   wherein the profile corresponding to the identifier of the eUICC of the device is related to the same phone number.

4. The terminal of claim 1, wherein the identifier of the eUICC is obtained based on pairing of the terminal and the device, and
   wherein the request message for the profile includes the identifier of the eUICC of the device.

5. A device comprising:
   a transceiver;
   at least one processor coupled with the transceiver and configured to:
      pair the device and a terminal,
      receive, from the terminal, a profile corresponding to an identifier of an embedded universal integrated circuit card (eUICC) of the device, wherein the profile corresponding to the identifier of the eUICC of the device includes a software packaging comprising at least one of a file system, an authentication key value or network access certification information; and
      the eUICC configured to install the profile corresponding to the identifier of the eUICC of the device,
   wherein a request message for the profile corresponding to the identifier of the eUICC of the device is transmitted to a profile server based on subscription information for the terminal and the device, and
   wherein the profile corresponding to the identifier of the eUICC of the device is transmitted from the profile server to the device through the terminal.

6. The device of claim 5, wherein one payment plan is shared for the terminal and the device based on the subscription information for the terminal and the device.

7. The device of claim 5,
   wherein same phone number is used for the terminal and the device, and
   wherein the profile corresponding to the identifier of the eUICC of the device is related to the same phone number.

8. The device of claim 5,
   wherein the identifier of the eUICC is transmitted to the terminal based on pairing of the terminal and the device, and
   wherein the request message for the profile includes the identifier of the eUICC of the device.

9. A profile server comprising:
   a transceiver; and
   at least one processor coupled with the transceiver and configured to:
      receive, from a terminal, a request message for a profile corresponding to an identifier of an embedded universal integrated circuit card (eUICC) of a device paired with the terminal, based on subscription information for the terminal and the device,
      identify the profile corresponding to the identifier of the eUICC of the device based on the identifier of the eUICC of the device, and
      transmit, to the terminal, the profile corresponding to the identifier of the eUICC of the device, wherein the profile includes a software packaging comprising at least one of a file system, an authentication key value or network access certification information,
   wherein the profile corresponding to the identifier of the eUICC of the device is transmitted to the device.

10. The profile server of claim 9,
    wherein the identifier of the eUICC is transmitted to the terminal based on pairing of the terminal and the device, and
    wherein the request message for the profile includes the identifier of the eUICC of the device.

11. The profile server of claim 9,
    wherein one payment plan is shared for the terminal and the device based on the subscription information for the terminal and the device,
    wherein same phone number is used for the terminal and the device, and
    wherein the profile corresponding to the identifier of the eUICC of the device is related to the same phone number.

12. A method performed by a terminal, the method comprising:
    pairing the terminal and a device comprising an embedded universal integrated circuit card (eUICC);
    obtaining subscription information for the terminal and the device;
    transmitting, to a profile server, a request message for a profile corresponding to an identifier of the eUICC of the device based on the subscription information for the terminal and the device;
    receiving, from the profile server, the profile corresponding to the identifier of the eUICC of the device, wherein the profile corresponding to the identifier of the eUICC of the device includes a software packaging comprising at least one of a file system, an authentication key value or network access certification information; and
    transmitting, to the device, the profile corresponding to the identifier of the eUICC of the device.

13. The method of claim 12, wherein one payment plan is shared for the terminal and the device based on the subscription information for the terminal and the device.

14. The method of claim 12,
wherein same phone number is used for the terminal and the device, and
wherein the profile corresponding to the identifier of the eUICC of the device is related to the same phone number.

15. The method of claim 12,
wherein the identifier of the eUICC is obtained based on pairing of the terminal and the device, and
wherein the request message for the profile includes the identifier of the eUICC of the device.

16. A method performed by a device, the method comprising:
pairing the device and a terminal;
receiving, from the terminal, a profile corresponding to an identifier of an embedded universal integrated circuit card (eUICC) of the device, wherein the profile corresponding to the identifier of the eUICC of the device includes a software packaging comprising at least one of a file system, an authentication key value or network access certification information; and
installing the profile corresponding to the identifier of the eUICC of the device,
wherein a request message for the profile corresponding to the identifier of the eUICC of the device is transmitted to a profile server based on subscription information for the terminal and the device, and
wherein the profile corresponding to the identifier of the eUICC of the device is transmitted from the profile server to the device through the terminal.

17. The method of claim 16, wherein one payment plan is shared for the terminal and the device based on the subscription information for the terminal and the device.

18. The method of claim 16,
wherein same phone number is used for the terminal and the device, and
wherein the profile corresponding to the identifier of the eUICC of the device is related to the same phone number.

19. The method of claim 16,
wherein the identifier of the eUICC is transmitted to the terminal based on pairing of the terminal and the device, and
wherein the request message for the profile includes the identifier of the eUICC of the device.

20. A method performed by a profile server, the method comprising:
receiving, from a terminal, a request message for a profile corresponding to an identifier of an embedded universal integrated circuit card (eUICC) of a device paired with the terminal, based on subscription information for the terminal and the device;
identifying the profile corresponding to the identifier of the eUICC of the device based on the identifier of the eUICC of the device; and
transmitting, to the terminal, the profile corresponding to the identifier of the eUICC of the device, wherein the profile corresponding to the identifier of the eUICC of the device includes a software packaging comprising at least one of a file system, an authentication key value or network access certification information,
wherein the profile corresponding to the identifier of the eUICC of the device is transmitted to the device.

21. The method of claim 20,
wherein the identifier of the eUICC is transmitted to the terminal based on pairing of the terminal and the device, and
wherein the request message for the profile includes the identifier of the eUICC of the device.

22. The method of claim 20,
wherein one payment plan is shared for the terminal and the device based on the subscription information for the terminal and the device,
wherein same phone number is used for the terminal and the device, and
wherein the profile corresponding to the identifier of the eUICC of the device is related to the same phone number.

* * * * *